US 7,027,247 B2

(12) United States Patent
Heydari et al.

(10) Patent No.: US 7,027,247 B2
(45) Date of Patent: Apr. 11, 2006

(54) SERVO CIRCUIT HAVING A SYNCHRONOUS SERVO CHANNEL AND METHOD FOR SYNCHRONOUSLY RECOVERING SERVO DATA

(75) Inventors: Fereidoon Heydari, Cupertino, CA (US); Hakan Ozdemir, San Jose, CA (US); Sadik O. Arf, Cupertino, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 228 days.

(21) Appl. No.: 09/993,778

(22) Filed: Nov. 5, 2001

(65) Prior Publication Data

US 2003/0048562 A1     Mar. 13, 2003

Related U.S. Application Data

(60) Provisional application No. 60/301,503, filed on Jun. 28, 2001.

(51) Int. Cl.
*G11B 5/09* (2006.01)
*G11B 27/36* (2006.01)

(52) U.S. Cl. .............................. 360/51; 360/31; 360/53
(58) Field of Classification Search ................. 360/75, 360/51, 53, 31, 46, 49
See application file for complete search history.

(56) References Cited

U.S. PATENT DOCUMENTS

| | | | |
|---|---|---|---|
| 5,384,671 A * | 1/1995 | Fisher | 360/51 |
| 5,576,904 A | 11/1996 | Behrens | |
| 5,661,760 A | 8/1997 | Patapoutian et al. | |
| 5,796,535 A | 8/1998 | Tuttle et al. | |

(Continued)

FOREIGN PATENT DOCUMENTS

EP     0 341 852     11/1989

OTHER PUBLICATIONS

European Search Report for EP 02 25 3882 dated Aug. 28, 2003.

(Continued)

*Primary Examiner*—David Hudspeth
*Assistant Examiner*—Glenda P. Rodriguez
(74) *Attorney, Agent, or Firm*—Lisa K. Jorgenson; Bryan A. Santarelli

(57) ABSTRACT

A new synchronous Partial Response Maximum Likelihood (PRML) servo is provided for a high track-per-inch disk-drive system. To increase the data capacity in hard disk drives (HDD), one can shorten the servo format and/or increase the track density. The new servo system has circuits that allow a high-performance and accurate system for positioning the read-write heads. The major circuits include burst demodulation, Viterbi detection, timing synchronization, and spin-up search. A highly linear discrete-fourier-transform (DFT) burst-demodulation circuit can demodulate high-density and low-signal-to-noise-ratio (SNR) position bursts. The Viterbi detection circuit includes a sync-mark detector and a Viterbi detector that are matched to at least two sets of Gray code ( e.g., ¼ rate and 4/12 rate) and pruned accordingly. The timing synchronization circuit includes phase restart and interpolating timing recovery (ITR) circuits to implement a fully digital timing recovery. The spin-up search circuit may include a robust multistage search circuit that detects a preamble and/or a DC field to search for an initial servo sector with a low error rate during spin up. In one example, the servo system samples each dibit 4 times throughout the entire servo sector uses PR4 equalization. The relatively low number of samples required for the system allows the servo format density to be near the channel bandwidth while increasing the SNR performance.

23 Claims, 16 Drawing Sheets

U.S. PATENT DOCUMENTS

| | | | |
|---|---|---|---|
| 5,812,336 A | | 9/1998 | Spurbeck et al. |
| 5,818,655 A | * | 10/1998 | Satoh et al. .................. 360/65 |
| 5,844,741 A | * | 12/1998 | Yamakawa et al. ........... 360/53 |
| 5,872,666 A | * | 2/1999 | Saiki et al. .................... 360/46 |
| 5,909,336 A | | 6/1999 | Schaffner et al. |
| 6,032,284 A | * | 2/2000 | Bliss ........................... 360/51 |
| 6,084,741 A | * | 7/2000 | Kim ......................... 360/78.04 |
| 6,108,151 A | * | 8/2000 | Tuttle et al. .................. 360/51 |
| 6,108,153 A | * | 8/2000 | Glover ........................ 360/51 |
| 6,201,652 B1 | | 3/2001 | Rezzi et al. |
| 6,347,390 B1 | * | 2/2002 | Ino ............................. 714/792 |
| 6,580,573 B1 | * | 6/2003 | Hull et al. .................... 360/46 |
| 6,650,614 B1 | * | 11/2003 | Pietruszynski et al. .. 369/124.1 |
| 6,680,807 B1 | * | 1/2004 | She et al. ..................... 360/51 |

OTHER PUBLICATIONS

European Search Report for EP 02 25 3883 dated Aug. 28, 2003.

* cited by examiner

SERVO CIRCUIT HAVING A SYNCHRONOUS SERVO CHANNEL AND METHOD FOR SYNCHRONOUSLY RECOVERING SERVO DATA

This application claims the benefit of Provisional application Ser. No. 60/301,503, filed Jun. 28, 2001.

CROSS-REFERENCE TO RELATED APPLICATIONS

This application is related to U.S. patent application Ser. No. 09/993877 entitled "DATA-STORAGE DISK HAVING FEW OR NO SPIN-UP WEDGES AND METHOD FOR WRITING SERVO WEDGES ONTO THE DISK," Ser. No. 09/993876 entitled "CIRCUIT AND METHOD FOR DETECTING A SERVO WEDGE ON SPIN UP OF A DATA-STORAGE DISK", Ser. No. 09/993869 entitled "CIRCUIT AND METHOD FOR DETECTING A SPIN-UP WEDGE AND A CORRESPONDING SERVO WEDGE ON SPIN UP OF A DATA-STORAGE DISK", entitled "A DATA CODE AND METHOD FOR CODING DATA", Ser. No. 09/993869 entitled "CIRCUIT AND METHOD FOR DEMODULATING A SERVO POSITION BURST", Ser. No. 09/993779 entitled "CIRCUIT AND METHOD FOR DETECTING THE PHASE OF A SERVO SIGNAL", which were filed on the same day as the present application and which are incorporated by reference.

BACKGROUND OF THE INVENTION

Field of the Invention

The invention is related generally to electronic circuits, and more particularly to a servo circuit having a synchronous servo channel and a method for synchronously recovering servo data from a data-storage disk. Such a servo circuit allows the servo data to have a higher density than many prior servo circuits can tolerate. Increasing the density of the servo data often allows one to increase the disk area that is available for storing application data, and to thus increase the disk's storage capacity.

As computer-software applications become larger and more data intensive, disk-drive manufacturers are continuing their efforts to develop technologies and techniques for increasing the data-storage capacities of data-storage disks. Although manufacturers have significantly increased the data-storage density (bits/inch) of disks over the years, further increasing the data-storage density is often difficult because of the accompanying increases in noise and intersymbol interference (ISI). In addition, because disks are typically constrained to industry-standard sizes, manufacturers often do not have the option of increasing a disk's storage capacity by increasing its size. Moreover, because most non-application data (e.g., servo wedges, DC-erase fields (spin-up wedges), file-allocation tables (FAT)) is necessary for proper operation of a disk drive, the manufacturers often cannot remove this data from a disk to make more room for storing application data.

FIG. 1 is a plan view of a conventional magnetic data-storage disk 10. The disk 10 is partitioned into a number—here eight—of disk sectors 12a–12h, and includes a number—typically in the tens or hundreds of thousands—of concentric data tracks 14a–14n. Readable-writable application data is stored in respective data sectors (not shown) within each track 14.

Referring to FIG. 2, data servo wedges 16—only servo wedges 16a–16c are shown for clarity—include servo data that allows a head-position circuit (FIG. 20) to accurately position a read-write head (FIGS. 5 and 20) during a data read or write operation. The servo wedges 16 are located within each track 14 at the beginning—the disk 10 spins counterclockwise in this example—of data fields that may contain one or more data sectors 12. Each servo wedge 16 includes respective servo data that indentifies the location (track 14 and sector 12) of the servo wedge. Thus, the head-position circuit uses this servo data to position the head over the track 14 to be read from or written to. The manufacturer of a disk drive (FIG. 20) that incorporates the disk 10 typically writes the servo wedges 16 onto the disk before shipping the disk drive to a customer; neither the disk drive nor the customer alters the servo wedges 16 thereafter. Servo wedges like the servo wedges 16 are further discussed below in conjunction with FIG. 6 and in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL," which is incorporated by reference.

Referring to FIG. 3, spin-up servo wedges 18—only spin-up wedges 18a–18c are shown for clarity—include spin-up data that allows the head-position circuit (FIG. 20) to accurately determine an initial position of the read-write head (FIGS. 5 and 20) on spin up of the disk 10. On many disks such as the disk 10, the spin-up wedges 18 are respective DC-erase fields, which are "blank" fields that cause the read-write head to generate a DC servo signal when the head reads them. Typically, the spin-up wedges 18 are respectively located within each track 14 a known distance from a portion (e.g., beginning, preamble, sector or track identifier) of a servo wedge 16 within the same track. For example, the spin-up wedges 18 may be located at the end of the sector 12h as illustrated, or may be located within a respective servo wedge 16. While or after the disk 10 spins up to normal speed following a disk-inactive mode such as a power-down or sleep mode, the head-position circuit moves the head from a parked position to an arbitrary position over the disk 10. But the head-position circuit does not "know" the position of the head with respect to the tracks 14 and sectors 12. Therefore, a servo circuit (not shown in FIGS. 1-3) attempts to detect one of the spin-up wedges 18. Because the spin-up wedges 18 are each a known distance from a portion of a respective servo wedge 16, the head-position circuit "knows" the relative circumferential position of the head over the disk 10 once the servo circuit detects a spin-up wedge 18. To determine the actual position of the head (i.e., the sector 12 and track 14 that the head is over), the servo circuit can read sector and track identifiers from the respective servo wedge 16. Once the head-position circuit determines the initial position of the head, the spin-up wedges 18 serve no further purpose, and thus are unused, until the next spin up of the disk 10. Additional details of the spin-up wedges 18 are known, and are thus omitted for clarity.

Referring to FIGS. 1–3, the density of the servo and spin-up data in the wedges 16 and 18 is typically much lower than the density of the application data. Because the servo and spin-up data have a relatively low density, the servo circuit (not shown in FIGS. 1–3) typically uses peak detection to detect and read servo data from the servo wedges 16 and spin-up data from the spin-up wedges 18.

Unfortunately, because the spin-up and servo data have a relatively low density, the wedges 16 and 18 occupy a significant area of the disk that could otherwise store application data. One way to reduce the area that the wedges 16 and 18 occupy is to increase the density of the servo and spin-up data. But increasing the density of the servo and spin-up data may increase ISI and noise, and thus often decreases the accuracy with which the peak-detecting servo circuit (not shown in FIGS. 1–3) reads this data.

SUMMARY OF THE INVENTION

In accordance with an embodiment of the invention, a servo circuit includes a synchronous Partial Response Maximum Likelihood (PRML) servo channel and a processor. The synchronous servo channel recovers servo data from servo wedges that identify respective data sectors on a data-storage disk, and the processor controls the operations of the synchronous servo channel.

By including a PRML servo channel that synchronously recovers servo data—as opposed to synchronously or asynchronously detecting the peaks generated by the servo data—such a servo circuit allows the servo data to have a higher density than many prior servo circuits can tolerate. Increasing the density of the servo data often increases a disk's storage capacity, i.e., the area that is available for storing application data, by reducing the disk area occupied by the servo data.

DESCRIPTION OF THE PREFERRED EMBODIMENTS

Figure 4:
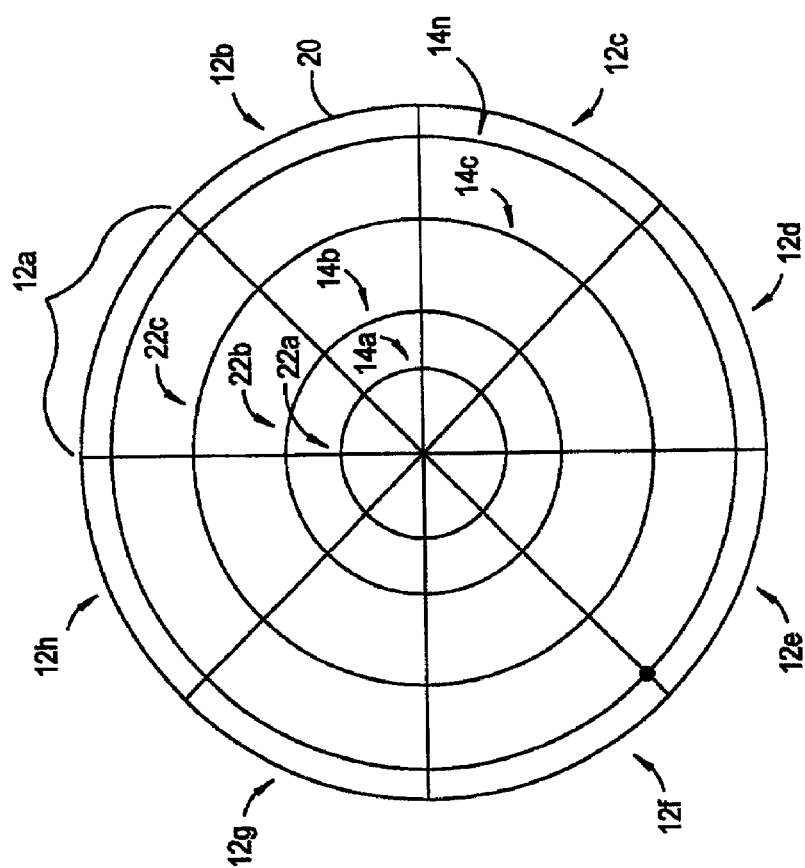
FIG. 4 is a plan view of a magnetic data-storage disk having no spin-up wedges such as DC-erase fields according to an embodiment of the invention.

FIG. 4 is a plan view of a magnetic data-storage disk 20, which has no spin-up wedges (such as DC-erase fields) and which stores servo data within the servo wedges 22 at a higher density than does the conventional disk 10 (FIG. 1) according to an embodiment of the invention. Omitting the spin-up wedges and increasing the density of the servo data increase the disk area available to store application data, and thus increase the data-storage capacity of the disk 20. Like the disk 10, the disk 20 is partitioned into a number—here eight—of disk sectors 12a–12h, and includes a number of concentric data tracks 14a–14n. The disk 20 also has servo wedges 22—for clarity, only servo wedges 22a–22c are shown—which may be similar to the servo wedges 16 of the disk 10.

Figure 3:
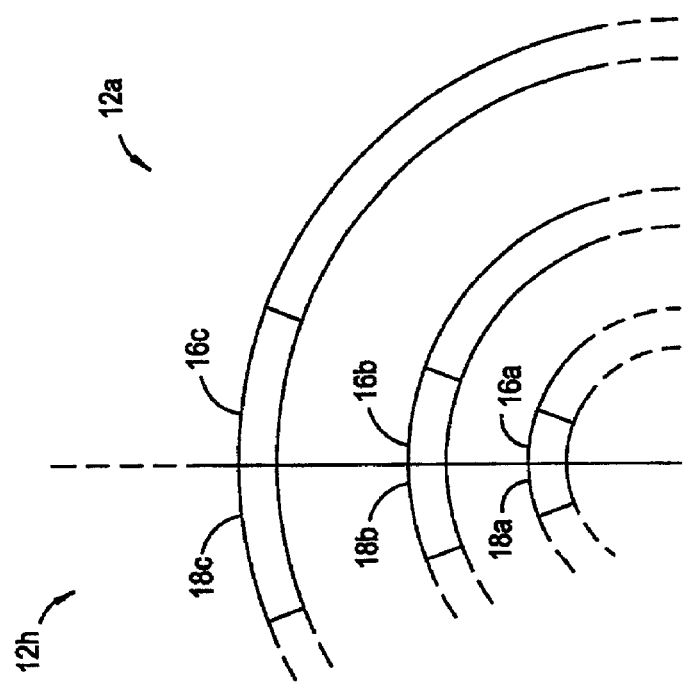
FIG. 3 is a close-up view of the servo wedges and the spin-up wedges of the FIG. 1 disk.
Figure 5:
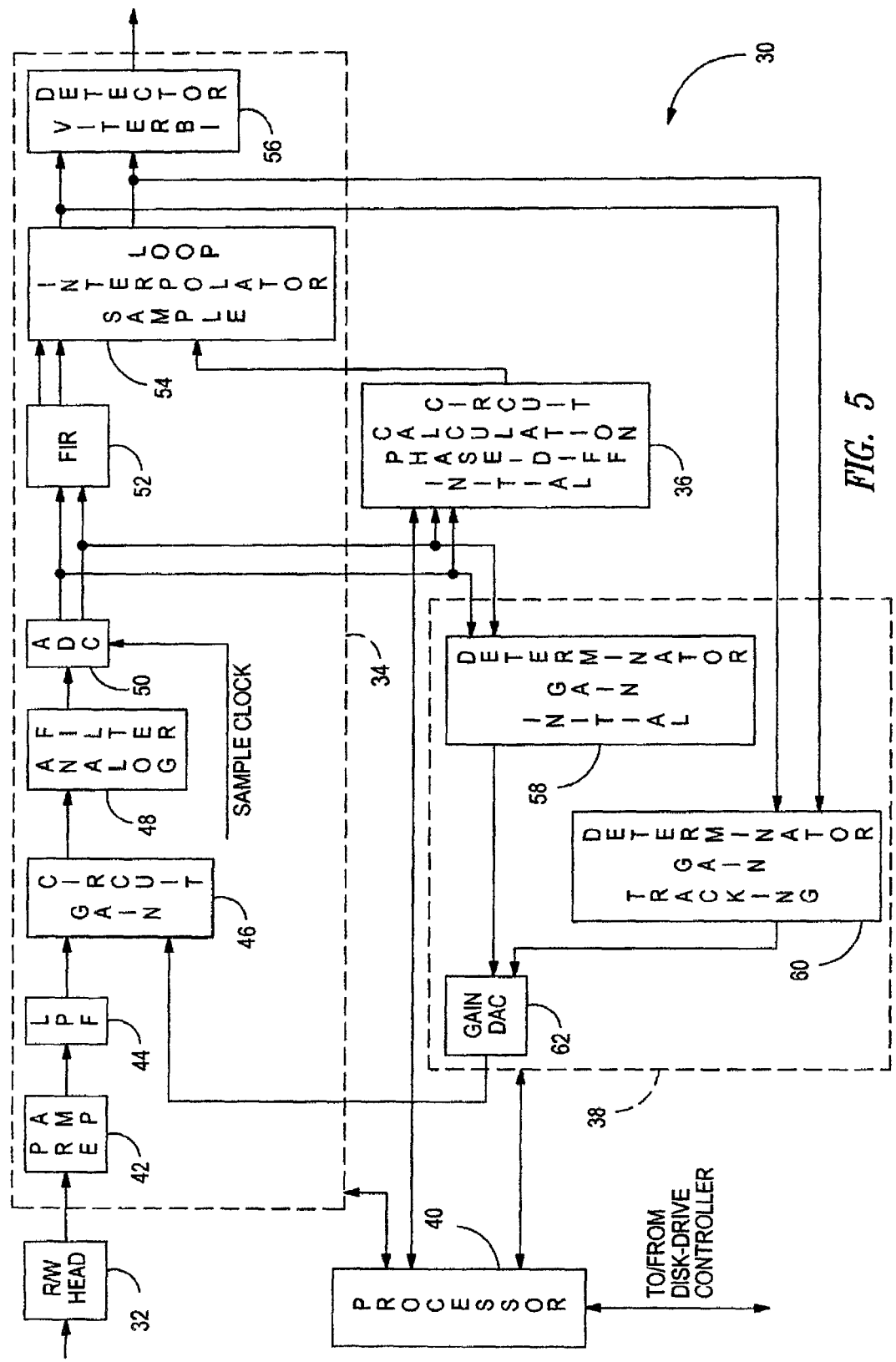
FIG. 5 is a block diagram of a servo circuit for detecting a servo wedge, or both a spin-up wedge and a servo wedge, on disk spin up and for recovering servo data from servo wedges according to an embodiment of the invention.

FIG. 5 is a partial block diagram of a servo circuit 30, which can detect a servo wedge 22 (FIG. 4) on spin up of the disk 20 (FIG. 4) without first detecting a spin-up wedge (FIG. 3) according to an embodiment of the invention. Thus, the circuit 30 can be used with a disk, such as the disk 20, that omits spin-up wedges to increase its data-storage capacity. But as discussed below in conjunction with FIGS. 15–18, the circuit 30 can also be used with a disk that includes spin-up wedges such as DC-erase fields.

Figure 2:
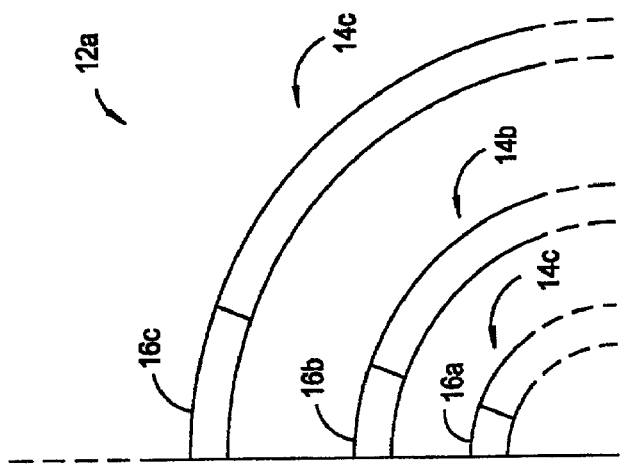
FIG. 2 is a close-up view of the servo wedges of the FIG. 1 disk.
Figure 1:
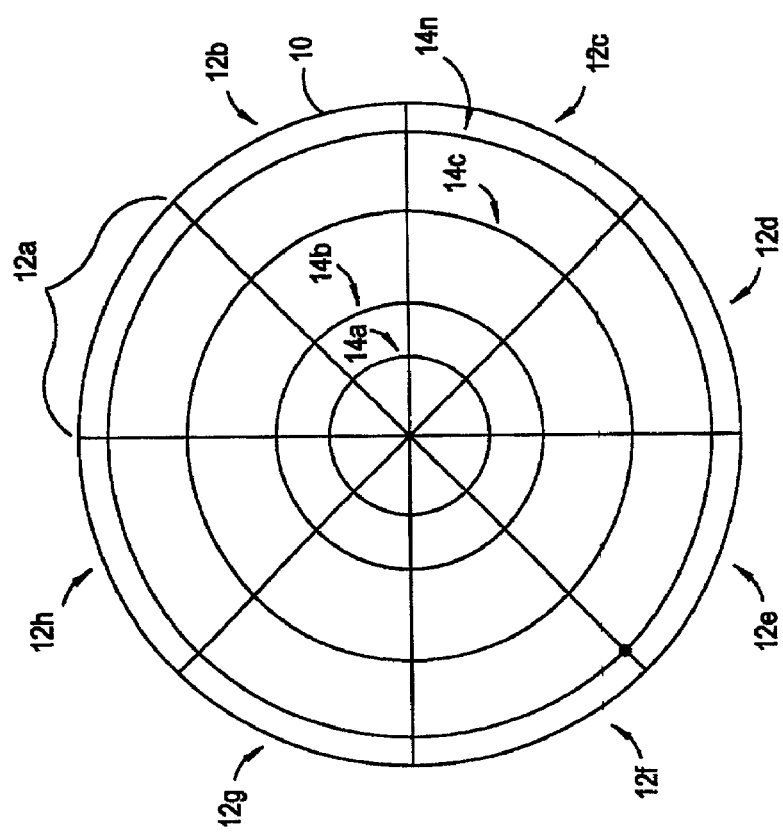
FIG. 1 is a plan view of a conventional magnetic data-storage disk having disk sectors and data tracks.

Furthermore, the servo circuit 30 is synchronous PRML, and thus can accurately recover high-density servo data such as the servo data stored on the disk 20 (FIG. 4). But the circuit 30 can also recover low-density servo data such as the servo data stored on the conventional disk 10 (FIG. 1).

Still referring to FIG. 5, the servo circuit 30 includes a read-write head 32 for generating a servo signal that represents a servo wedge 22 (FIG. 4) being read. The circuit 30 also includes a servo channel 34 for processing the servo signal, a circuit 36 for calculating an initial phase difference between servo samples and the servo signal, a circuit 38 for controlling the overall gain of the servo channel 34, and a processor 40 for controlling the servo channel 34, the phase-calculation circuit 36, and the gain-control circuit 38. Alternatively, the processor 40 may be replaced with a state machine or other control circuit (not shown).

The processor 40 causes the servo channel 34 to detect a servo wedge 22 (FIG. 1) on spin up of the disk 20 (FIG. 4), and to recover servo data from the servo wedge 22 on disk spin up and during a disk read or write operation. The channel 34 may also function as a read channel to recover application data from a disk data sector (not shown) during a disk read operation. Alternatively, a separate read channel (not shown) may recover the application data during a disk read operation.

Figure 20:
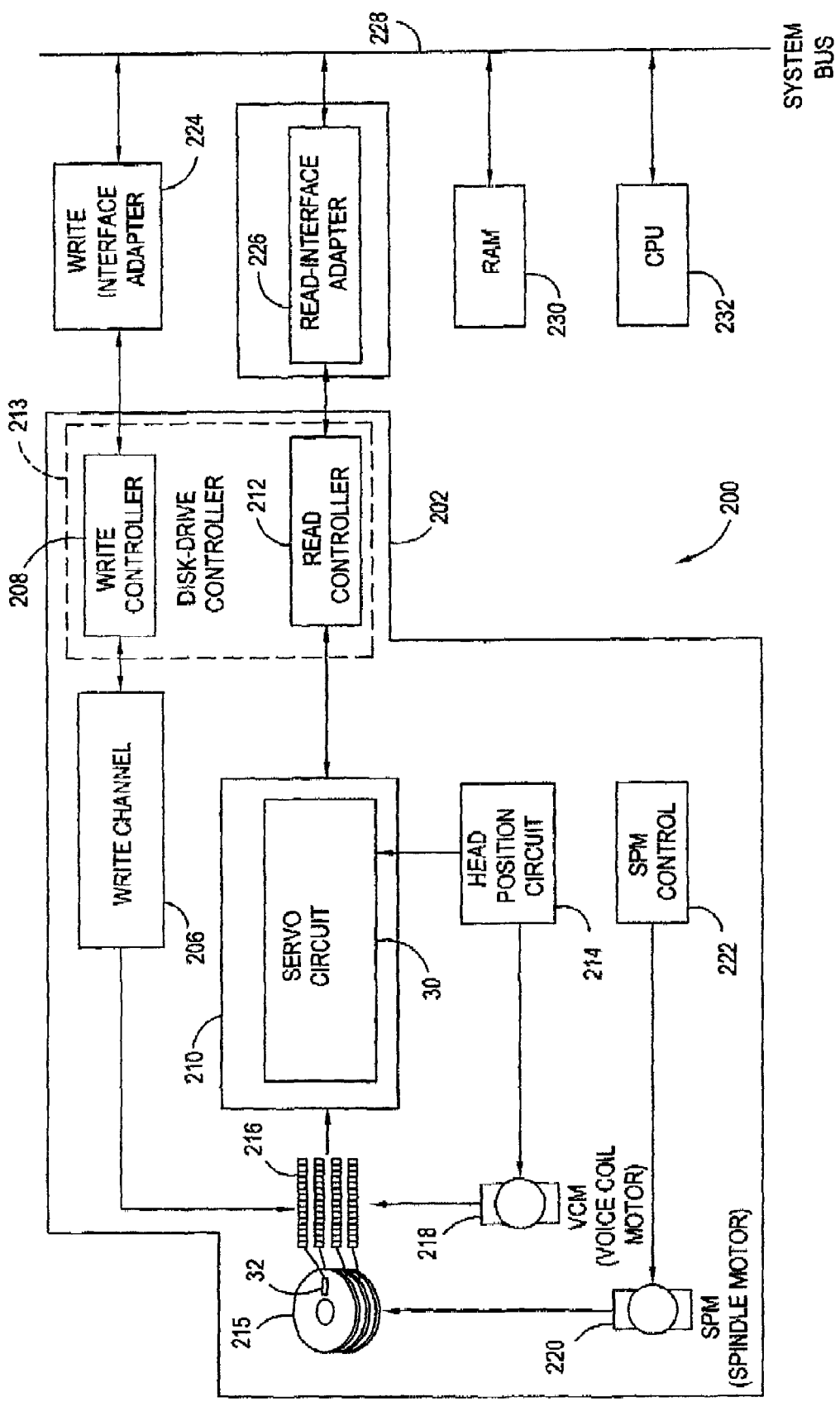
FIG. 20 is a block diagram of a disk-drive system that incorporates the servo circuit of FIG. 19 according to an embodiment of the invention.

The servo channel 34 includes a preamplifier 42, a continous lowpass filter (LPF) 44, a gain circuit 46, an analog filter 48, an analog-to-digital converter (ADC) 50, a finite-impulse-response (FIR) filter 52, a sample-interpolator loop 54, and a Viterbi detector 56. The preamplifier 42 amplifies the servo signal generated by the read-write head 32 as it reads the disk 20 (FIG. 4), and the LPF 44 equalizes the servo signal. The gain circuit 46 amplifies the equalized servo signal so as to set the amplitude of the equalized servo signal to a desired level, and the ADC 50 samples and digitizes the amplified servo signal in response to a sample clock. The FIR filter 52 is used to provide additional boost to better equalize consecutive digitized samples—here two consecutive samples at a time—to the target power spectrum of the channel 34. The sample-interpolator loop 54 effectively synchronizes the sample clock to the servo signal by interpolating the values of the FIR samples to the values they would have had if the sample clock were synchronized to the servo signal. The Viterbi detector 56, which is designed for the target polynomial, recovers the servo-data bit sequence from the servo signal by processing the interpolated samples—here two samples at a time. As discussed below in conjunction with FIG. 6, a portion of the recovered bit sequence identifies the track 14 and sector 12 that hold the servo wedge 22 from which the bit sequence is recovered. Therefore, the Viterbi detector provides this portion of the recovered bit sequence to the head-position circuit (FIG. 20). In one embodiment, the FIR filter 52 equalizes the servo-signal samples to a PR4 power spectrum, and the Viterbi detector 56 is constructed according to a PR4 polynomial. The benefits of a servo channel designed for a PR4 polynominal are discussed in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL," which is heretofore incorporated by reference.

The phase-calculation circuit 36 determines an initial phase difference between the sample clock and the servo signal. The sample-interpolator loop 54 uses this initial phase difference to capture, i.e., acquire, the phase of the sample clock with respect to the servo signal. Although the loop 54 can acquire the phase of the sample clock without this initial phase difference, it would take a significantly longer time, and thus a significantly longer servo wedge 22, to do so. Therefore, the circuit 36 often allows the disk 20 to have a higher data-storage capacity by allowing the servo wedges 22 to be shorter. The circuit 36 is further discussed in conjunction with FIG. 11 below, in commonly owned U.S. patent application Ser. No. 09/503,453, filed Feb. 14, 2000, entitled "CIRCUIT AND METHOD FOR DETERMINING THE PHASE DIFFERENCE BETWEEN A SAMPLE CLOCK AND A SAMPLED SIGNAL", and in commonly owned U.S. patent application Ser. No. 09/503,929, filed Feb. 14, 2000, entitled "CIRCUIT AND METHOD FOR DETERMINING THE PHASE DIFFERENCE BETWEEN A SAMPLE CLOCK AND A SAMPLED SIGNAL BY LINEAR APPROXIMATION", which are incorporated by reference.

The gain circuit 38 includes an initial-gain determinator 58, a tracking-gain determinator 60, and a digital-to-analog converter (DAC) 62. The initial-gain determinator 58 determines an initial amplitude of the servo signal from the interpolated servo-signal samples. The DAC 62 uses this initial amplitude to generate a gain-control signal that causes the gain circuit 46 to set the overall gain of the servo channel 34 to a desired level. Although the circuits 38 and 46 can set the gain without the benefit of this initial amplitude, it would take a significantly longer time, and thus a significantly longer servo wedge 22, to do so. Therefore, like the phase-calculation circuit 36, the initial-gain determinator 58 often allows the disk 20 to have a higher data-storage capacity by allowing the servo wedges 22 to be shorter. After the circuit 58 determines the initial amplitude, the tracking-gain determinator 60 acquires and locks onto, i.e., tracks, the amplitude of the servo signal for the remainder of the servo wedge 22. As with the circuit 58, the DAC 62 converts the amplitude from the circuit 60 into a gain-control signal for the gain circuit 46. In one embodiment, the DAC 62 generates a logarithmically scaled gain-control signal.

Still referring to FIG. 5, the initial-gain determinator 58 is further discussed in conjunction with FIG. 12 below and in commonly owned U.S. patent application Ser. No. 09/503,949, filed Feb. 14, 2000, entitled "A CIRCUIT AND METHOD FOR CONTROLLING THE GAIN OF AN AMPLIFIER BASED ON THE SUM OF SAMPLES OF THE AMPLIFIED SIGNAL", and Ser. No. 09/503,399, filed Feb. 14, 2000, entitled "A CIRCUIT AND METHOD FOR CONTROLLING THE GAIN OF AN AMPLIFIER", which are incorporated by reference.

Figure 6:
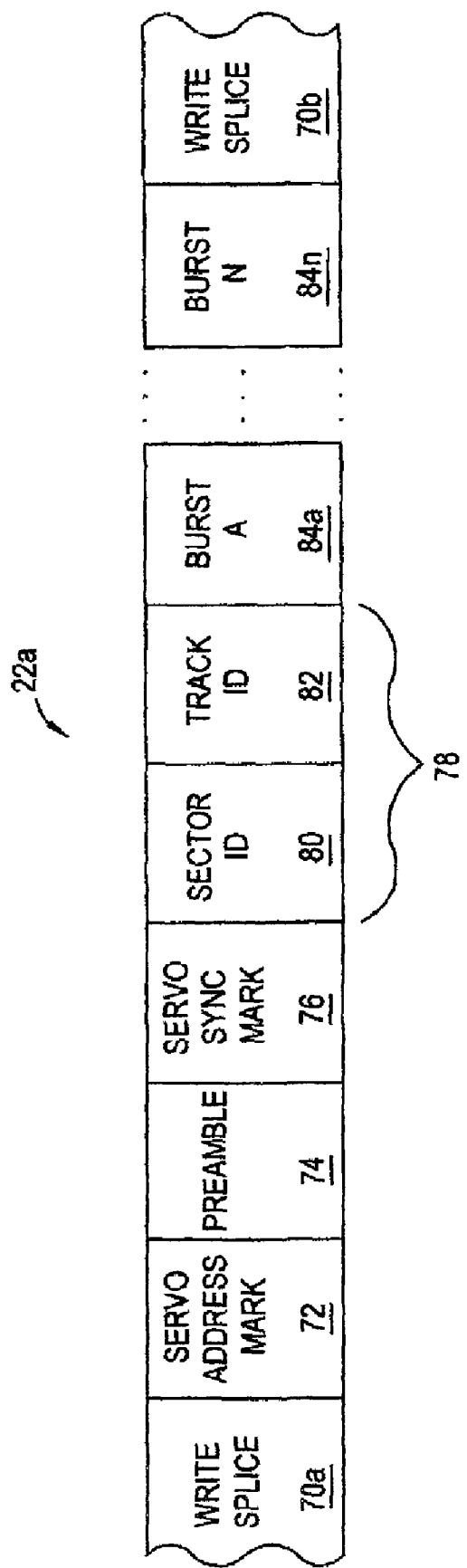
FIG. 6 is a diagram of a servo wedge of FIG. 4 according to an embodiment of the invention.

FIG. 6 is a diagram of the servo wedge 22a of FIG. 4, the other servo wedges 22 being similar. Write splices 70a and 70b respectively separate the servo wedge 22a from adjacent data sectors (not shown). A servo address mark (SAM) 72 indicates to the head-position circuit (FIG. 20) that the read-write head 32 (FIG. 5) is at the beginning of the servo wedge 22a. A servo preamble 74 allows the sample-interpolator loop 54 (FIG. 5) to synchronize the sample clock (FIG. 5), and a servo synchronization mark (SSM) 76 identifies the beginning of a head-location identifier 78. The preamble 74 and SSM 76 are further discussed below in conjunction with FIG. 14. The location identifier 78 allows the head-position circuit to coarsely determine and adjust the position of the head 32 with respect to the surface of the disk 20 (FIG. 4). More specifically, the location identifier 78 includes a sector identifier 80 and a track identifier 82, which respectively identify the disk sector 12 and the data track 14—here the sector 12a and the track 14a—that contain the servo wedge 22a. Because the head 32 may read the location identifier 78 even if the head is not directly over the track 14a, the servo wedge 22a also includes bursts 84a–84n, which allow the head-position circuit to finely determine and adjust the position of the head 32. Furthermore, the servo wedge 22a may be encoded according to a 1/4 code, 4/12 code, or any other suitable code. A suitable 1/4 code is described in commonly owned U.S. patent application Ser. No. 09/99,009, filed the same day as the present application, entitled "A DATA CODE AND METHOD FOR CODING DATA", which is incorporated by reference. And a suitable 4/12 code as described in commonly owned U.S. Pat. No. 6,201,652 and in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL", which are incorporated by reference.

Figure 7:
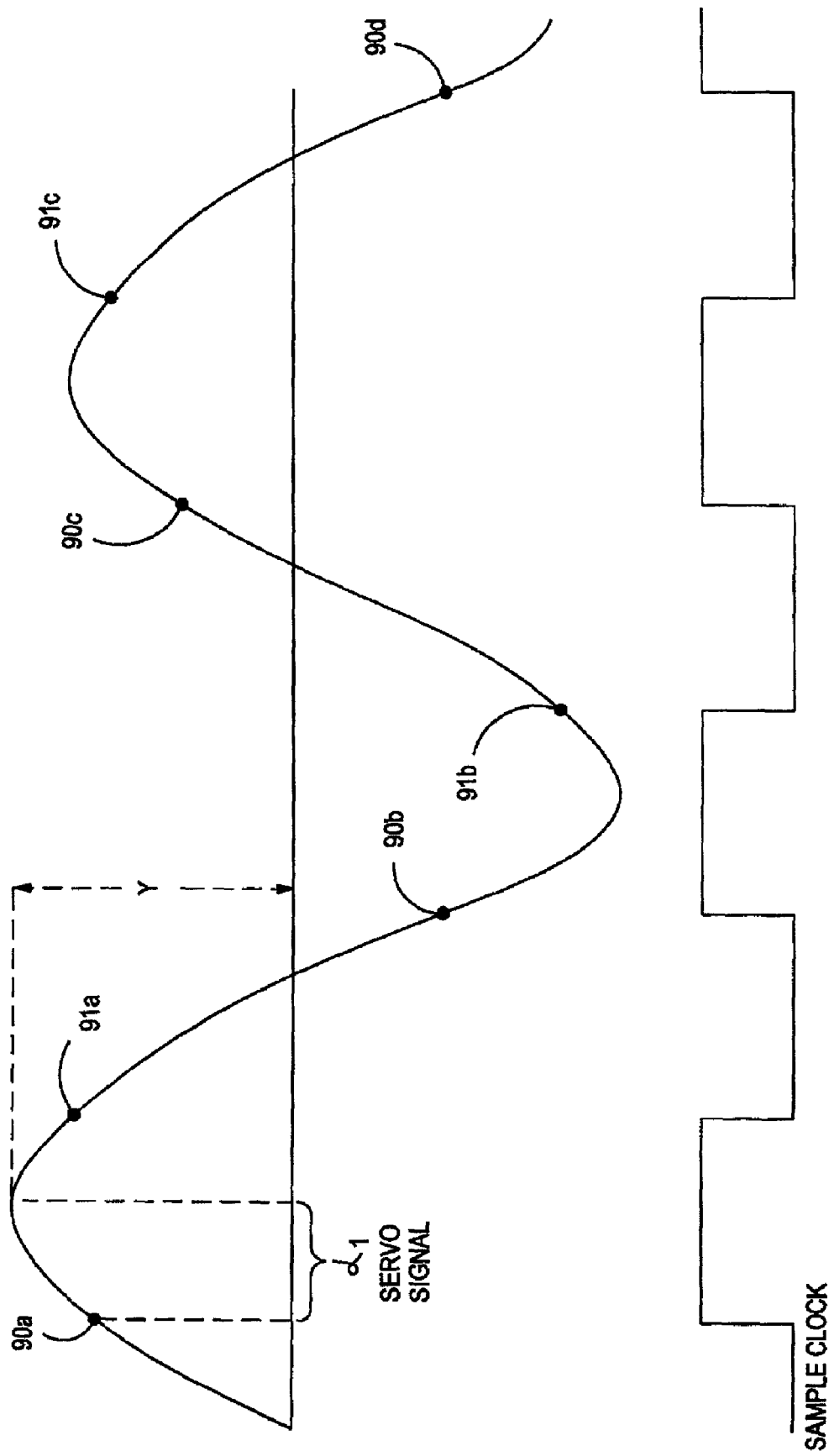
FIG. 7 is a servo signal that the read-write head generates while reading the servo preamble of FIG. 6 on disk spin up according to an embodiment of the invention.

FIG. 7 is a diagram of the sinusoidal servo signal generated by the read-write head 32 (FIG. 5) while it is over the preamble 74 (FIG. 6) of the servo wedge 22a (FIGS. 4 and 6), the sample clock (FIG. 5), and the even samples 90a–90d and odd samples 91a–91c taken by the ADC 50 (FIG. 5). Although in this embodiment the even and odd samples respectively correspond to the rising and falling edges of the sample clock, in other embodiments the even and odd samples may respectively correspond to the falling and rising edges of the sample clock.

Figure 8:
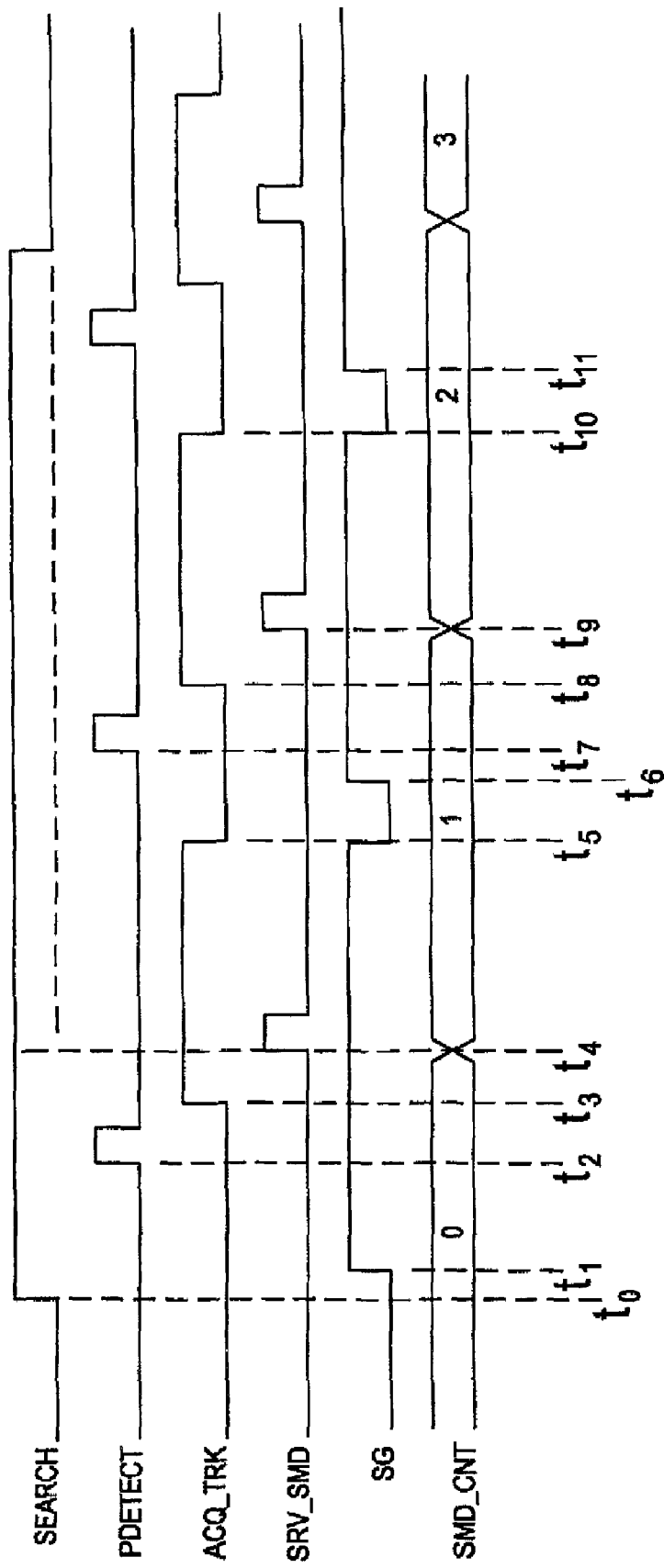
FIG. 8 is a timing diagram of signals that are relevant to the operation of the servo circuit of FIG. 5 during disk spin up according to an embodiment of the invention where the servo circuit need not detect a spin-up wedge.

FIG. 8 is a timing diagram of some of the signals associated with the servo circuit 30 (FIG. 5) on disk spin up according to an embodiment of the invention. For clarity, these signals are omitted from FIG. 5. A disk-drive controller (FIG. 20) transitions SEARCH and Servo Gate SG to active levels—here a logic 1—to cause the processor 40 (FIG. 5) to begin searching for a servo wedge 22 (FIG. 4) on spin up of the disk 20 (FIG. 4). The processor 40 transitions PDETECT to an active level—here a logic 1—to indicate that it has detected the preamble 74 (FIG. 6) of a servo wedge 22 as discussed below. After the processor 40 detects the preamble 74 of a servo wedge 22, it transitions ACQ_TRK to an active level—here logic 1—to cause the sample interpolater loop 54 track the phase of the samples to the phase of the servo signal as described below. When the processor 40 detects the servo sync mark (SSM 76 of FIG. 6) that follows the detected preamble 74, it transitions SRV_SMD to an active level—here logic 1—to inform the disk-drive controller that it has detected the sync mark 76. If the disk-drive controller is programmed to require the processor 40 to detect multiple consecutive sync marks 76 before determining an initial position of the head 32 (FIG. 5), then the processor 40 or the controller increments a counter SMD_CNT to keep track of the number of consecutive sync marks 76 detected during spin up.

Referring to FIGS. 4–8, the operation of the servo circuit 30 on spin-up of the disk 20 is discussed according to an embodiment of the invention. For clarity, the operation is explained for the circuit 30 detecting the servo wedge 22a first on disk spin up, it being understood that the operation is similar if the circuit 30 detects another servo wedge 22 first.

First, the disk 20 spins up from an inactive speed, typically 0 rotations per minute (rpm), to an operating speed such as 5400 rpm. The disk 20 may be at the inactive speed during a period when the disk-drive system (FIG. 20) that incorporates the disk is powered down or is in a power-savings, i.e., sleep, mode. While or after the disk 20 spins up to the operating speed, the head-position circuit (FIG. 20) moves the read-write head 32 from a parked position to a position over the disk. But the head-position circuit does not "know" the position of the head 32 until the servo circuit 30 detects the servo wedge 22a and recovers the location identifier 78 therefrom.

Next, at times $t_0$ and $t_1$, the disk-drive controller (FIG. 20) respectively transistions SEARCH and SG to active levels, which cause the servo circuit 30 to "look for" and detect a servo wedge 22, here the servo wedge 22a. Specifically, the circuit 30 "looks for" and detects the preamble 74 of the servo wedge 22a. Referring to FIG. 7 and as discussed above, the read-write head 32 generates a sinusoidal servo signal, i.e., a preamble sinusoid, while over the preamble 74. As discussed below, the circuit 30 exploits the properties of a sinusoid to detect the preamble 74. The servo circuit 30 may execute this spin-up detection algorithm before or after the disk 20 attains operating speed, or may begin executing this algorithm before the disk 20 attains the operating speed and continue executing the algorithm after the disk 20 attains operating speed.

More specifically, to detect the preamble 74 of the servo wedge 22a, the processor 40 stores a number of consecutive samples of the preamble sinusoid, for example three even samples 90a–90c and three odd samples 91a–91c (a total of six consecutive samples). Consecutive edges of the sample clock, and thus consecutive samples 90 and 91, are approximately 90° apart with respect to the preamble sinusoid. Therefore, consecutive clock edges of the same polarity, and thus consecutive even samples 90 and consecutive odd samples 91, are approximately 180° apart. For a sinusoid, the sum of consecutive points spaced 180° apart equals zero. Therefore, to detect the preamble 74, the processor 40 sums each consecutive pair of even samples and each consecutive pair of odd samples of the preamble sinusoid according to the following equations:

$$E1=90a+90b \qquad (1)$$

$$E2=90b+90c \qquad (2)$$

$$O1=91a+91b \qquad (3)$$

$$O2=91b+91c \qquad (4)$$

If $E1=E2=O1=O2=0$, then the processor 40 determines that the samples 90 and 91 could represent a preamble sinusoid. But $E1=E2=O1=O2=0$ is also true if the servo signal is merely a zero-frequency, i.e., DC signal. Therefore, to distinguish a DC signal from a preamble sinusoid, the processor 40 averages the magnitudes of the even samples 90a and 90b to generate a first average even sample AE, and averages the magnitudes of the odd samples 91a and 91b to generate a first average odd sample AO according to the following equations:

$$AE=(|90a|+|90b|) \div 2 \qquad (5)$$

$$AO=(|91a|+|91b|) \div 2 \qquad (6)$$

Furthermore, according to a known trigonemetric identity of sinusoids, $(Y \sin \alpha_1)^2 + (Y \cos \alpha_1)^2 = Y^2$. Therefore, this identity holds for the preamble sinusoid. Furthermore, according to known mathematical principles that are omitted for clarity, $AE = Y \cos \alpha_1$ and $AO = Y \sin \alpha_1$. Therefore, to further determine whether the head 32 is over the preamble 74, the processor 40 calculates the following equation:

$$AMP=sqrt(AE^2+AO^2) \qquad (7)$$

Because of noise and intersymbol interference (ISI), E1, E2, O1, and O2 may not equal exactly zero when the head 32 is over the preamble 74. Furthermore, the value of AMP may vary because the gain circuit 46 has not yet had a chance to adjust the gain of the servo channel 34. Therefore, the processor 40 determines whether the following comparisons are true:

$$E1 < \text{Threshold\_low} \qquad (8)$$

$$E2 < \text{Threshold\_low} \qquad (9)$$

$$O1 < \text{Threshold\_low} \qquad (10)$$

$$O2 < \text{Threshold\_low} \qquad (11)$$

$$AMP > \text{Threshold\_high} \qquad (12)$$

where Threshold_low and Threshold_high are determined based on the expected gain of the servo channel 34 and the noise and interference present on the servo signal, and Threshold_high is also determined based on the expected amplitude Y of the preamble sinusoid.

If equations (8)–(12) are all true, then the processor 40 increments a first counter (not shown) to a nonzero value. If not all of equations (8)–(12) are true, then the processor 40 resets the counter to zero. The processor 40 continues calculating equations (1)–(12) and incrementing or resetting the counter for subsequent even and odd samples 90 and 91. A C-language software routine used to model the spin-up detection algorithm is included in Appendix A.

As long as the first counter (not shown) has a nonzero value, the processor 40 causes the circuit 36 to calculate an initial value for the phase difference $\alpha_1$ between the sample clock and the servo signal, and causes the determinator 58 to determine an initial value for the amplitude Y of the servo signal.

When the first counter (not shown) reaches a predetermined nonzero value, for example eight, at time $t_2$, the processor 40 detects a servo preamble, here the preamble 74 of the servo wedge 22a, transitions PDETECT to an active level, and institues a predetermined delay. During this delay, the processor causes the sample-interpolator loop 54 to begin synchronizing the samples 90 and 91 to the servo signal—the samples 90 and 91 are synchronized to the servo signal when $\alpha_1=0$—using the initial value of $\alpha_1$ from the circuit 36, and causes the gain circuit 46 to begin setting the overall gain of the servo channel 34 to a desired level using the initial value of Y from the circuit 38 (via the DAC 62). This mode is called the acquistion mode, and is similar to the capture mode of a conventional phase-locked loop (PLL, not shown). That is, during the acquisition mode, the sample-interpolator loop 54 is relatively "fast" so that it can drive $\alpha_1$ to or nearly to 0° relatively quickly. Likewise, the gain circuit 38 is relatively fast so that it can set the gain of the servo channel 34 to the desired level relatively quickly. This predetermined delay, and thus the length of the acquisition mode, is measured with a second counter (not shown) and typically equals the latency of the sample-interpoloator loop 54, which is twenty three samples in one embodiment.

When the predetermined delay has elapsed at time $t_3$, the processor 40 transitions ACQ_TRK to an active level and causes the sample-interpolator loop 54 to begin tracking the servo signal. That is, the processor 40 causes the loop 54 to maintain a minimum, preferably zero, value for the phase difference $\alpha_1$ between the samples and the servo signal, and to maintain the gain of the servo circuit 30 at a desired level. The tracking mode is similar to the lock mode of a conventional PLL. A difference between the acquiring and tracking modes is that in the tracking mode, the loop 54 and gain circuit 38 have slower responses than they have in the acquiring mode.

In one embodiment, to insure accurate tracking of the servo signal, the loop 54 must receive a predetermined number—eight in one embodiment—of consecutive preamble samples 90 and 91 after entering the tracking mode or the processor 40 aborts the current spin-up detection cycle. Specifically, after entering the tracking mode, the processor 40 executes the preamble-detect procedure described above in conjunction with equations (1)–(12). If the processor 40 does not detect the preamble 74 for at least the predetermined number of samples, it transitions ACQ_TRK to an inactive level (transition not shown in FIG. 8), resets the first and second counters (not shown) and the initial phase and amplitude values for $\alpha_1$ and Y, and re-executes the above-described spin-up detection algorithm from the beginning.

Once the loop 54 is tracking the servo signal, the processor 40 examines the output of the Viterbi detector 56 to determine if and when the detector 56 recovers the servo synchronization mark (SSM) 76. Because the processor 40 may erroneously detect a burst 84 as the preamble 74, the processor 40 searches for the SSM 76 within a predetermined time window after the loop 54 begins tracking the servo signal. If the processor 40 finds the SSM 76 within this time window, then at time $t_4$ it transitions SRV_SMD to an active level and allows the Viterbi detector 56 to recover the location identifier 78, which the head-position circuit (FIG. 20) uses to determine an initial position of the head 32. If the processor 40 does not find the SSM 76 within this time window, then it does not transition SRV_SMD to an active level and re-executes the above-described spin-up detection algorithm from the beginning. In one embodiment, the predetermined time window has a programmable length of between 80–200 clock cycles (equivalent to 80–200 samples if there is one sample per clock cycle).

In response to the detection of the SSM 76, the disk-drive controller (FIG. 20) transitions SEARCH to an inactive level (this transition of SEARCH shown in dashed line at time $t_4$). After time $t_4$, SG and ACQ_TRK remain at active levels for a predetermined time ($t_5-t_4$) that is sufficient for the servo channel 34 to finish reading the servo wedge 22a. At time $t_5$, SG and ACQ_TRK transition to inactive levels, and the processor 40 locks the servo channel 34 in the tracking mode or in a coasting mode where the phase of the samples and the gain of the servo channel 34 are held at their respective current values. Typically, the programming of the processor 40 determines the mode, tracking or coasting, in which it locks the servo channel 34.

Still referring to FIGS. 4–8, in one embodiment one can program the processor 40 to recover multiple SSMs 76—here three consecutive SSMs—before the disk-drive controller (FIG. 20) allows the head-position circuit (FIG. 20) to determine an initial position of the head 32. Recovering multiple SSMs 76 makes the spin-up detection algorithm more robust by increasing the probability that none of the recovered SSMs 76 were falsely recovered.

More specifically, when the processor 40 recovers the first SSM 76, it transitions SRV_SMD to an active level at time $t_4$ as described above, and it also increments SMD_CNT, or causes the disk-drive controller (FIG. 20) to increment SMD_CNT at time $t_4$. After time $t_4$, SEARCH remains at an active level (solid line at time $t_4$), and SG and ACQ_TRK remain at active levels for the predetermined time $t_5-t_4$. At time $t_5$, SG and ACQ_TRK transition to inactive levels to lock the servo channel 34 in the tracking or coasting mode.

Next, the head-position circuit (FIG. 20) determines a tentative initial position of the read-write head (FIG. 5) based on the recovery of the first SSM 76. Then, based on this tentative position, the disk-drive controller (FIG. 20) transitions SG to an active level at a time $t_6$ when the controller anticipates that the head is aligned with the beginning of the next servo wedge 22. The controller can determine the beginning of the next servo wedge 22 by counting the number of sample-clock cycles after it transitions SG to an inactive level at time $t_5$ or by other conventional techniques. The processor 40 then implements the preamble-detection algorithm to detect the preamble at time $t_7$, put the sample-interpolator loop 54 and gain circuit 38 in tracking mode at time $t_8$, and recover the second SSM 76 at time $t_9$ in a manner similar to that described above for the recovery of the first SSM 76.

If the processor 40 recovers the second SSM 76, it transitions SRV_SMD to an active level at time $t_9$, and it or the disk-drive controller (FIG. 20) increments SMD_CNT also at time $t_9$. SEARCH remains at an active level and SG and ACQ_TRK remain at active levels for the predetermined time ($t_{10}-t_9=t_5-t_4$), after which SG and ACQ_TRK transition to inactive levels at time $t_{10}$ to lock the servo channel 34 in the tracking or coasting mode.

Next, the head-position circuit (FIG. 20) determines a tentative initial position of the read-write head (FIG. 5) based on the recovery of the second SSM 76. Then, based on this tentative position, the disk-drive controller (FIG. 20) transitions SG to an active level at time $t_{11}$ when the controller anticipates that the read-write head is aligned with the beginning of the next servo wedge 22. The processor 40 then implements the preamble-detection algorithm and attempts to recover the third SSM 76 in a manner similar to that described above for the recovery of the second SSM 76.

The processor 40 repeats this procedure until it recovers the desired number—here three—of consecutive SSMs 76. If this procedure is unsuccessful, then SEARCH remains at an active level, and the processor 40 resets SMD_CNT and re-executes the spin-up detection procedure from the beginning until it recovers the desired number of consecutive SSMs 76. Furthermore, although the recovered consecutive SSMs 76 are typically within the same track 14, this is not required.

Figure 9:
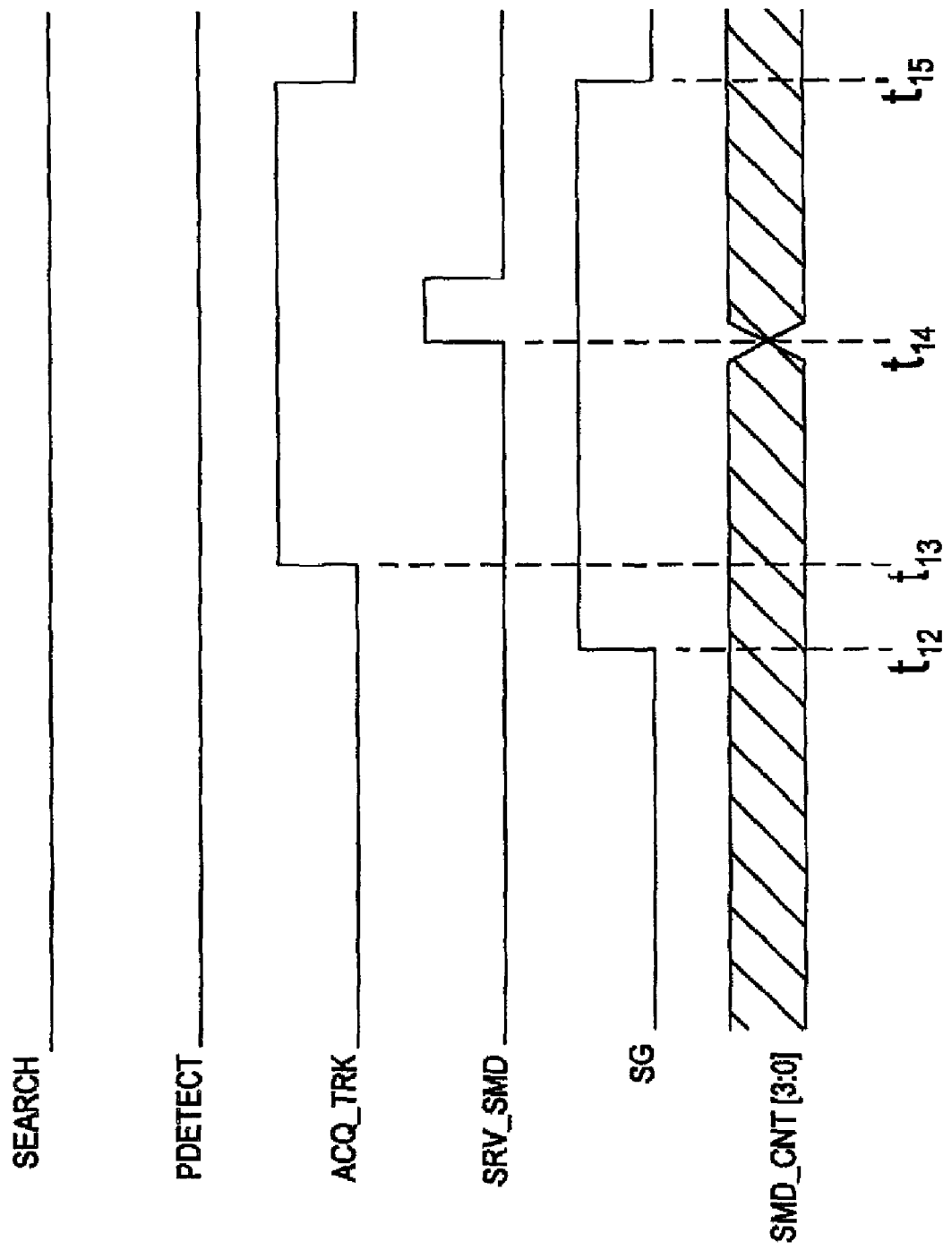
FIG. 9 is a timing diagram of the signals of FIG. 8 after disk spin up according to an embodiment of the invention.

FIG. 9 is a timing diagram of the signals of FIG. 8 during post-spin-up, i.e., normal, operation of the servo circuit 30 of FIG. 5 according to an embodiment of the invention. SEARCH, PDETECT, and SMD_CNT are inactive during normal operation. A major difference between spin-up and normal operation is that the preamble detection algorithm is not used during normal operation because the disk-drive controller (FIG. 20) "knows" the position of the read-write head (FIG. 5).

Referring to FIGS. 4–7 and 9, during normal operation the disk-drive controller (FIG. 20), transitions SG to an active level at time $T_{12}$, which is when the controller determines that the read-write head (FIG. 5) is at the beginning of a servo wedge 22. In response to SG having an active level, the processor 40 causes the circuits 36 and 58 to calculate initial phase and gain values for $\alpha_1$ and Y as described above. After a first predetermined delay, which is 16 samples in one embodiment, the processor 40 causes the sample-interpolator loop 54 and gain circuit 38 to enter the acquisition mode as described above. Then, after a second predetermined delay that in one embodiment equals the latency of the loop 54, the processor 40 transistions ACQ_TRK to an active level at time $t_{13}$ and causes the loop 54 and circuit 38 to enter the tracking mode as described above. The processor 40 recovers the SSM 76 at time $t_{14}$, and in response transistions SRV_SMD to an active level SG and ACQ_TRK remain active from time $t_4$ until time $t_5$, which is long enough for the servo channel 34 to read the servo data in the servo wedge 22.

Figure 10:
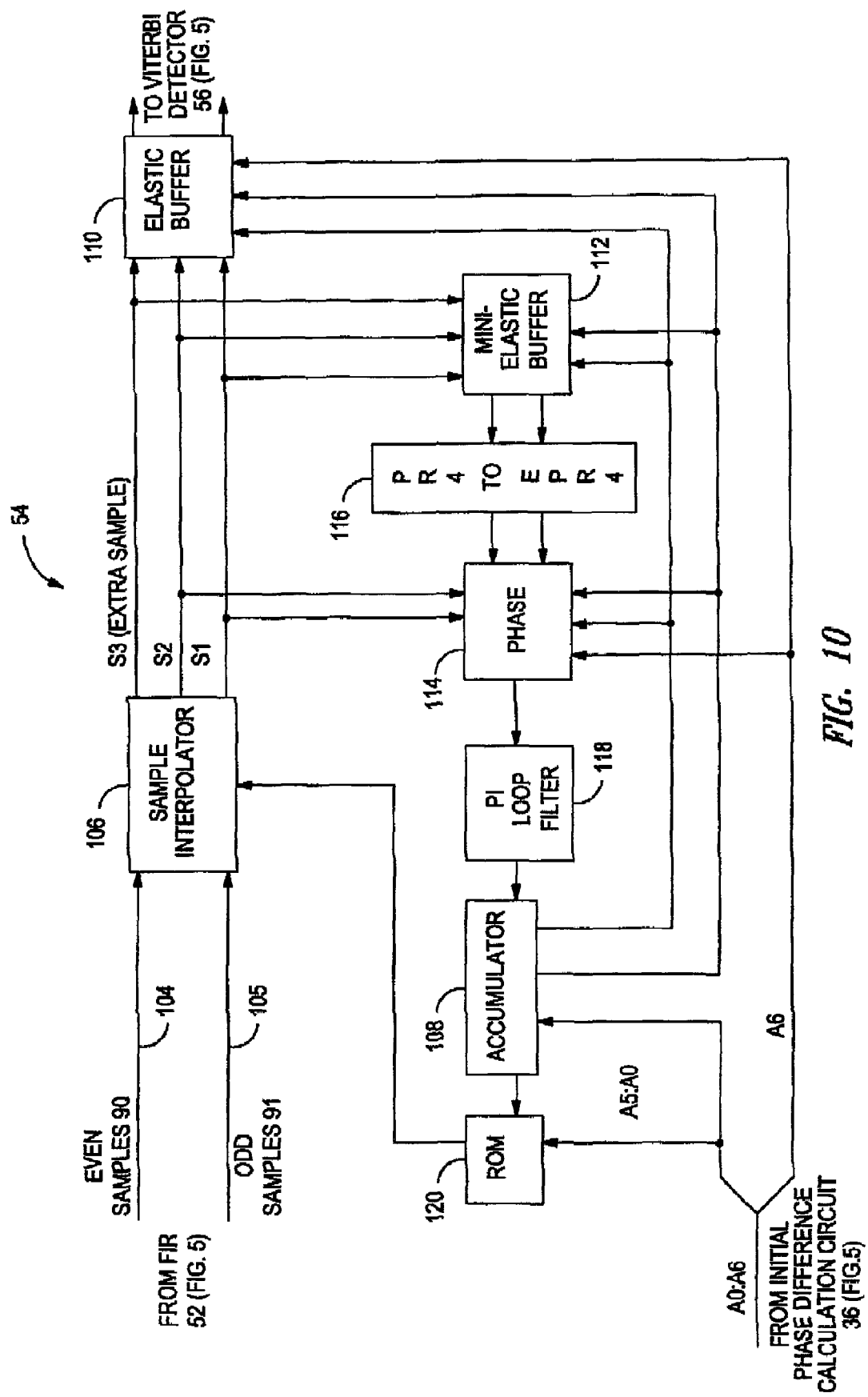
FIG. 10 is a block diagram of the sample-interpolator loop of FIG. 5 according to an embodiment of the invention.

FIG. 10 is a block diagram of the sample-interpolator loop 54—which is sometimes called a digital-baud-rate-timing-recovery circuit—of FIG. 5 according to an embodiment of the invention. Although details of the circuit 54 are discussed below, further details are disclosed in commonly owned U.S. patent application Ser. No. 09/387,146, filed Aug. 31, 1999, entitled "DIGITAL TIMING RECOVERY USING BAUD RATE SAMPLING", which is incorporated by reference.

Still referring to FIG. 10, the FIR 52 (FIG. 5) provides equalized even and odd samples 90 and 91 on data paths 104 and 105, respectively. From the equalized samples, a sample interpolator 106 calculates interpolated samples at an interpolation interval provided by an accumulator 108. The sample interpolator 106 has three output paths. Two of the output paths provide the two interpolated samples S1 and S2, which are derived in parallel by the interpolator 106. The third output path provides an uninterpolated sample S3, which may be needed in an undersampling condition. The interpolator 106 provides all three samples S1, S2, and S3 to an elastic buffer 110 and to a mini-elastic buffer 112, which provides the correct stream of data to a phase detector 114 (described below). In embodiments where the loop 54 is designed to operate on EPR4 samples but the servo channel 34 (FIG. 5) is designed to generate PR4 samples, a PR4-to-EPR4 converter 116 converts the PR4 samples from the mini-elastic buffer 112 into EPR4 samples.

Note that because of the parallel sampling paths throughout the system, the sample interpolator 106 outputs two interpolated samples S1 and S2 during each cycle of normal operation. During an oversample condition, the interpolator 106 provides one valid interpolated sample and one bogus interpolated sample. In an undersample condition, the interpolator 106 outputs three samples: the interpolated sample S1, the interpolated sample S2, and the uninterpolated sample S3, which is provided by the interpolator 106 to compensate for the fact that the interpolator 106 cannot interpolate two samples in one (half-rate) cycle.

The interpolator 106 also provides the interpolated samples S1 and S2 to the phase detector 114, which determines the phase difference between the interpolated samples S1 and S2 and the expected values of the samples S1 and S2, and which generates a corresponding phase-error signal. The phase detector 114 provides this phase-error signal to a proportional-integral filter 118, which provides the filtered error signal to the accumulator 108. The accumulator 108 derives the fractional delay, also known as the interpolation value tau ($\tau$), from the filtered error signal.

The interpolation value $\tau$ is used to select a set of coefficients employed by the sample interpolator 106 to derive the interpolation samples S1 and S2. These coefficient values are stored in a read only memory (ROM) 120, which receives the $\tau$ value from the accumulator 108 and provides to the sample interpolator 106 the appropriate coefficient values corresponding to the desired interpolation interval.

Still referring to FIG. 10, as discussed above in conjunction with FIGS. 4–8 and as discussed below in conjunction with FIG. 11, the phase calculation circuit 36 (FIG. 5) calculates a gain-independent 7-bit initial value for the phase angle $\alpha_1$ (FIGS. 7, 11), which represents the phase lead of the sample clock (FIG. 5) with respect to the zero crossings and peaks of the preamble sinusoid (FIG. 7). The circuit 36 provides bits A5:A0 of $\alpha_1$ to the accumulator 108 and to the ROM 120. This portion of $\alpha_1$ is used to select the initial set of coefficients that is input to the sample interpolator 106 at the start of a read cycle. Furthermore, the circuit 36 provides the bit A6 of $\alpha_1$ to the elastic buffer 110 and to the phase detector 114.

Figure 11:
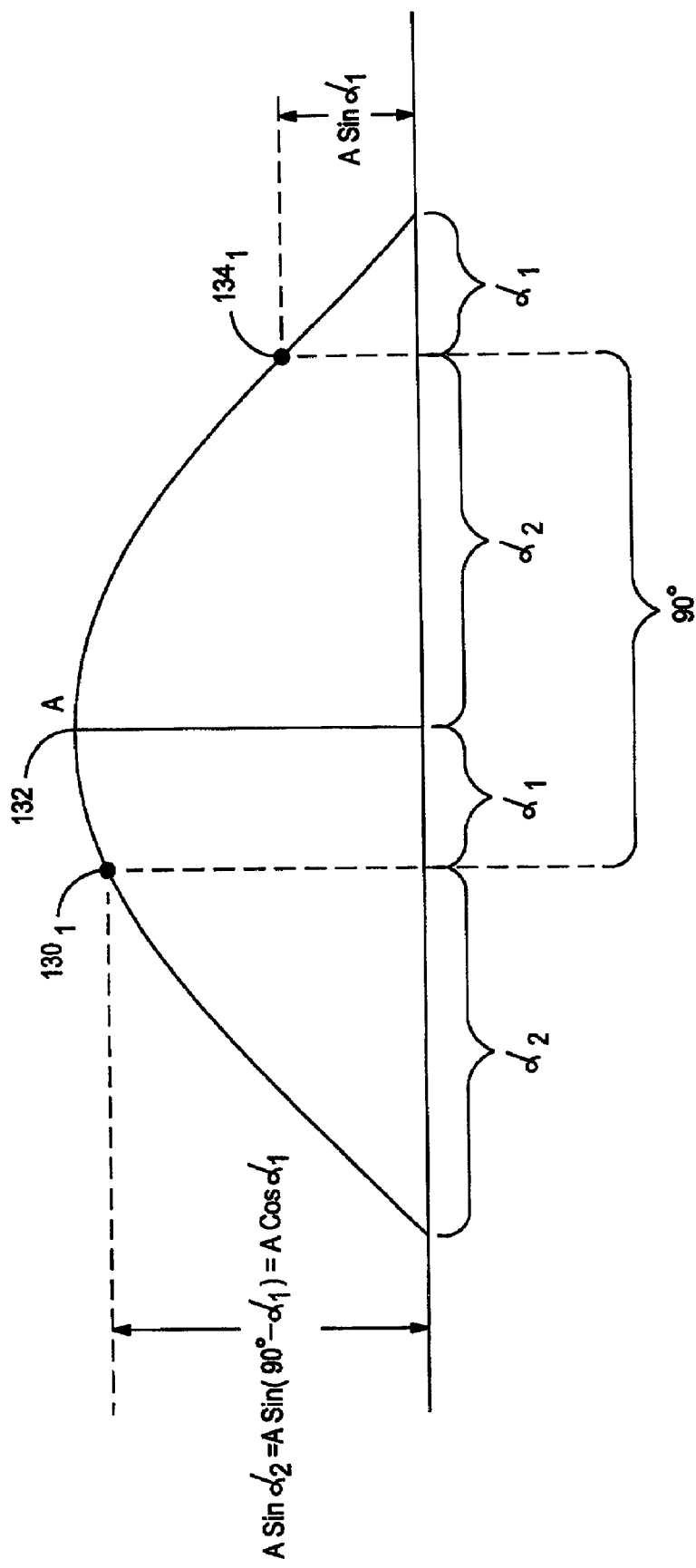
FIG. 11 is a phase diagram used to explain how the initial-phase-difference-calculation circuit of FIG. 5 calculates an initial phase angle between the sample clock and the peak of the preamble sinusoid according to an embodiment of the invention.

FIG. 11 is a phase diagram of a positive half of the preamble sinusoid of FIG. 7, and illustrates how the phase calculation circuit 36 (FIG. 5) can use a tangent function to obtain a gain-independent initial value for the phase angle $\alpha_1$ between the preamble sinusoid and the sample clock. Specifically, the first sample 130, which in one embodiment corresponds to a rising edge of the sample clock, leads the sinusoid peak 132 by the phase angle $\alpha_1$, which is <45° here. From well-known trigonometric identities, $\alpha_1$ is calculated according to the following equations:

$$\text{Tan } \alpha_1 = \text{Sin } \alpha_1 / \text{Cos } \alpha_1 = (\text{second sample } 134) \div (\text{first sample } 130), \qquad (13)$$

$$\alpha_1 = \text{Arctan} \alpha_1 = \text{Arctan}[(\text{second sample } 134) \div (\text{first sample } 130)]. \qquad (14)$$

Further details of the circuit 36, techniques for calculating an initial value for $\alpha_1 > 45°$, and other techniques for calculating a gain-independent value for the initial phase angle $\alpha_1$ between the preamble sinusoid and the sample clock are discussed in commonly owned U.S. patent application Ser. No. 09/503,453, filed Feb. 14, 2000, entitled "CIRCUIT AND METHOD FOR DETERMINING THE PHASE DIFFERENCE BETWEEN A SAMPLE CLOCK AND A SAMPLED SIGNAL", and U.S. patent application Ser. No. 09/503,929, filed Feb. 14, 2000, entitled "CIRCUIT AND METHOD FOR DETERMINING THE PHASE DIFFERENCE BETWEEN A SAMPLE CLOCK AND A SAMPLED SIGNAL BY LINEAR APPROXIMATION", which are incorporated by reference.

Figure 12:
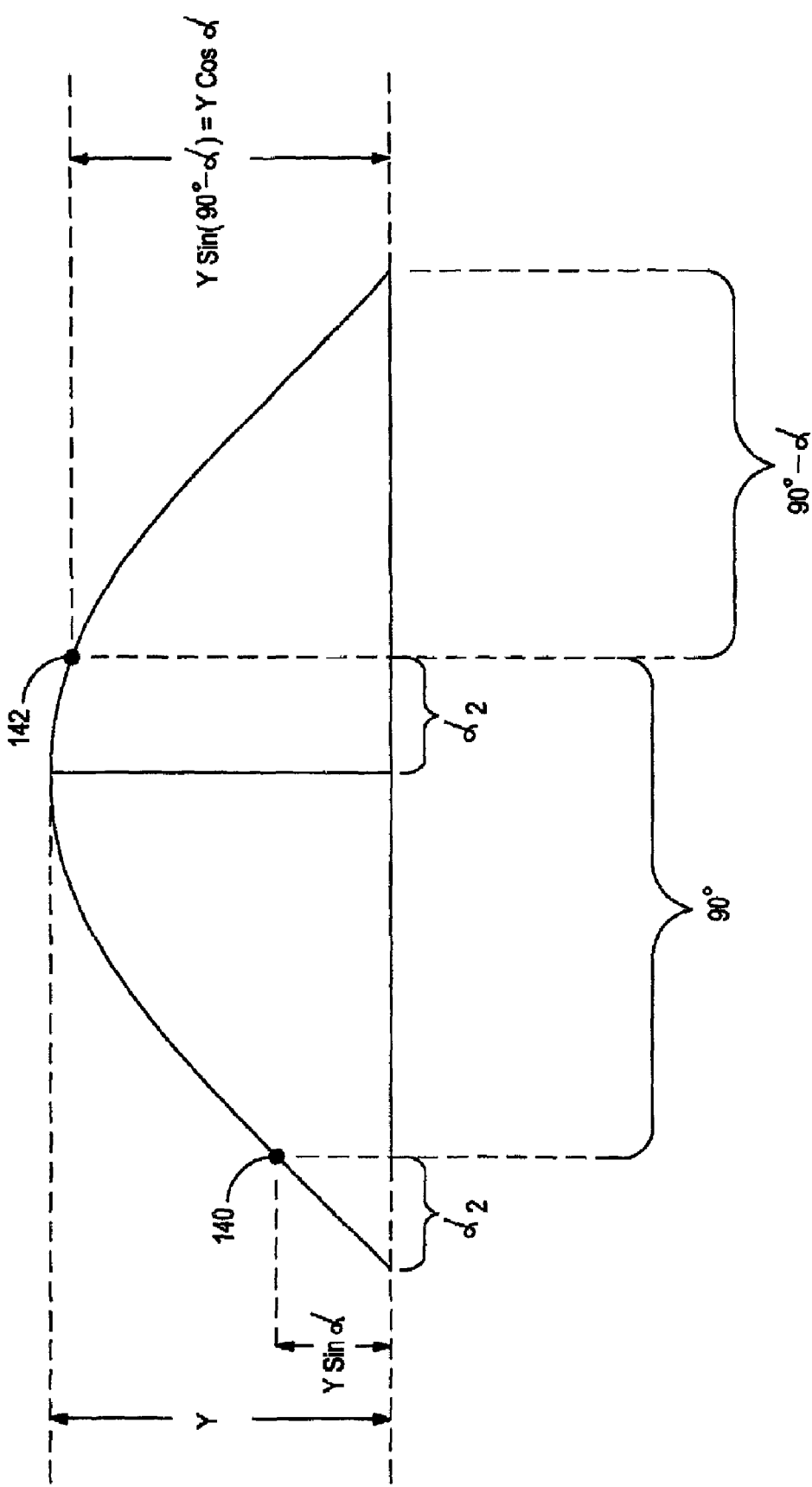
FIG. 12 is a phase diagram used to explain how the initial-gain determinator of FIG. 5 calculates an initial amplitude of the preamble sinusoid according to an embodiment of the invention.

FIG. 12 is a phase diagram of a positive half period of the preamble sinusoid of FIG. 7, and illustrates how the initial-gain determinator 58 (FIG. 5) calculates a gain-independent initial value for the peak amplitude Y of the preamble sinusoid. Specifically, samples 140 and 142 are 90° apart with respect to the preamble sinusoid. Therefore, the determinator 58 calculates the amplitude Y according to the following equations, which follow from the trigonometric identity $\operatorname{Sin}^2\alpha_2+\operatorname{Cos}^2\alpha_2=1$:

$$(Y \operatorname{Sin} \alpha_2)^2+(Y \operatorname{Cos} \alpha_2)^2 = Y^2 \operatorname{Sin}^2\alpha_2+Y^2 \operatorname{Cos}^2\alpha_2 = Y^2$$
$$(\operatorname{Sin}^2\alpha_2+\operatorname{Cos}^2\alpha_2)=Y^2 \quad (15)$$

$$\text{Sample } 140 = Y \operatorname{Sin} \alpha_2 \quad (16)$$

$$\text{Sample } 142 = Y \operatorname{Cos} \alpha_2 \quad (17)$$

$$Y^2 = (\text{sample } 140)^2 + (\text{sample } 142)^2 \quad (18)$$

From the initial value for the amplitude Y, the determinator 58 generates an initial gain adjustment so as to change the gain of the gain circuit 46 (FIG. 5) such that the peak magnitude of the samples 140 and 142 at the input to the Viterbi detector 56 (FIG. 5) will thereafter be nearer or equal to the desired peak magnitude. Further details of the determinator 58 are discussed in commonly owned U.S. patent application Ser. No. 09/503,949, filed Feb. 14, 2000, entitled "A CIRCUIT AND METHOD FOR CONTROLLING THE GAIN OF AN AMPLIFIER BASED ON THE SUM OF SAMPLES OF THE AMPLIFIED SIGNAL", and U.S. patent application Ser. No. 09/503,399, filed Feb. 14, 2000, entitled "A CIRCUIT AND METHOD FOR CONTROLLING THE GAIN OF AN AMPLIFIER", which are incorporated by reference.

Figure 13:
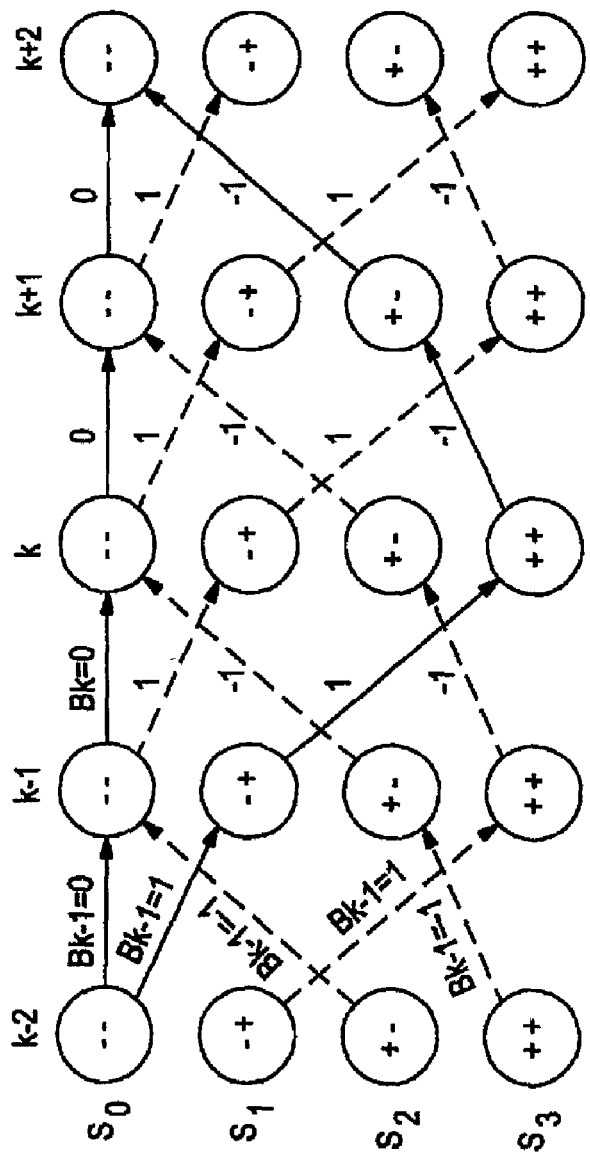
FIG. 13 is a trellis diagram for the Viterbi detector of FIG. 5 according to an embodiment of the invention.

FIG. 13 is a pruned trellis diagram that illustrates the operation of the Viterbi detector 56 (FIG. 5) according to an embodiment of the invention. The Viterbi detector 56 is constructed for a PR4 target polynomial $B_k = A_k - A_{k-2}$, where $B_k$ is the interpolated sample of the servo signal at sample time k, $A_k$ is the logic value (0 or 1) of the sampled bit of the servo data at sample time k, and $A_{k-2}$ is the logic value of the sampled bit of the servo data at sample time k−2. Therefore, the trellis has four states that represent four possible states of the coded sequence: S0 (00 or −−), S1 (01 or −+), S2 (10 or +−), and S3 (11 or ++). Furthermore, in one embodiment the servo data is coded—Gray coded in one embodiment—as a 4:12 run-length-limited (RLL) code having d=2, k=10, and having single pairs and only single pairs of logic 1's. Because the servo data is so constrained, the Viterbi detector 56 can be "pruned" such that the number of branches between the states S0–S3 at consecutive sample times k is reduced from eight branches (two incoming branches per state S0–S3) to five branches. Thus, only the state S0 has more than one—here two—incoming branches. The combination of the servo data being constrained according to the above-described code and the Viterbi detector 56 being pruned to match the code increases the minimum squared distance error by a factor of two compared to a combination of uncoded servo data and a full-state (eight branches) Viterbi detector. This increase in the minimum squared distance reduces by 6 dB the minimum servo-signal SNR required by the detector 54, and thus makes recovery of the servo data more reliable for a given servo-signal SNR. The two solid-line paths depict two possible sequences that constitute the minimum-distance closed-error event. The Viterbi detector 56 and the servo-data coding scheme are further discussed in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL", which is incorporated by reference. Viterbi detectors and trellis diagrams are further discussed in commonly owned U.S. patent application Ser. No. 09/409,923, filed Sep. 30, 1999, entitled "PARITY-SENSITIVE VITERBI DETECTOR AND METHOD FOR RECOVERING INFORMATION FROM A READ SIGNAL", and 09/410,274, filed Sep. 30,1999, entitled "CIRCUIT AND METHOD FOR RECOVERING SYNCHRONIZATION INFORMATION FROM A SIGNAL", which are incorporated by reference.

Figure 14:
FIG. 14 is the respective bit patterns of the preamble and servo synchronization mark of FIG. 6 according to an embodiment of the invention.

FIG. 14 shows the preamble 74 and SSM 76 of FIG. 6 according to an embodiment of the invention. In this embodiment, the bit sequences that compose the preamble 74 and SSM 76 are coded according to the coding scheme described above in conjunction with FIG. 13.

Figure 15:
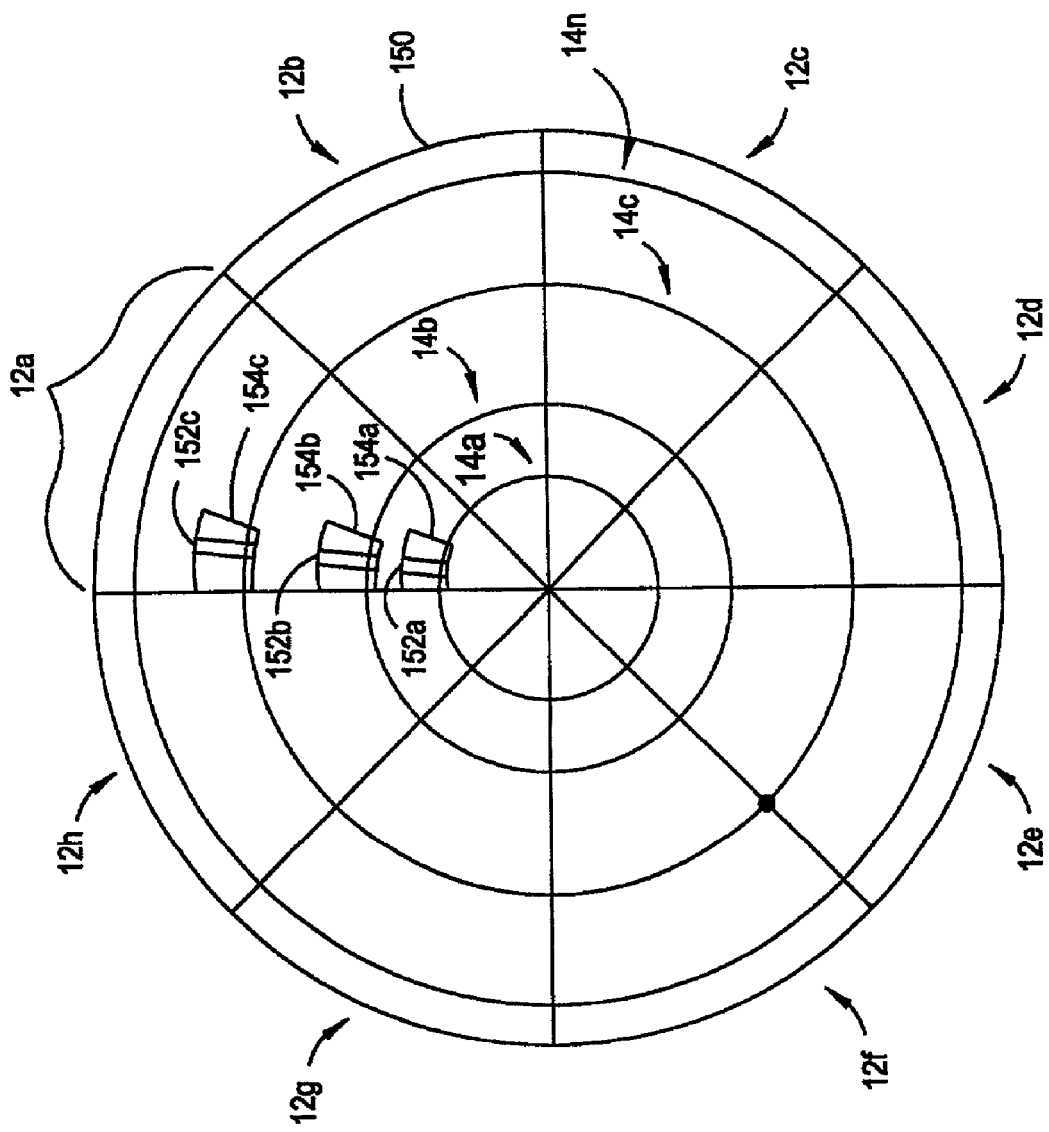
FIG. 15 is a plan view of a magnetic data-storage disk having spin-up wedges according to an embodiment of the invention.

FIG. 15 is a plan view of a magnetic data-storage disk 150, which is similar to the disk 20 (FIG. 4) except that it includes spin-up wedges 152 according to an embodiment of the invention. Although including the the spin-up wedges 152 may cause the disk 150 to have a smaller data-storage capacity than the disk 20, it allows one to increase the robustness of the spin-up detection algorithm as discussed below. Furthermore, because the servo data on the disk 150 has a higher density than the servo data on the conventional disk 10 (FIG. 1), the disk 150 can have a larger data-storage capacity than the disk 10 even though both the disks 10 and 150 include spin-up wedges.

Like the disk 20, the disk 150 is partitioned into a number—here eight—of disk sectors 12a–12h and includes a number of concentric data tracks 14a–14n. The disk 150 also includes servo wedges 154, which incorporate the spin-up wedges 152. But other than incorporating the spin-up wedges 152, the servo wedges 154 are similar to the servo wedges 22 of the disk 20. In one embodiment, the spin-up wedges 152 are or include respective DC-erase fields.

Figure 16:
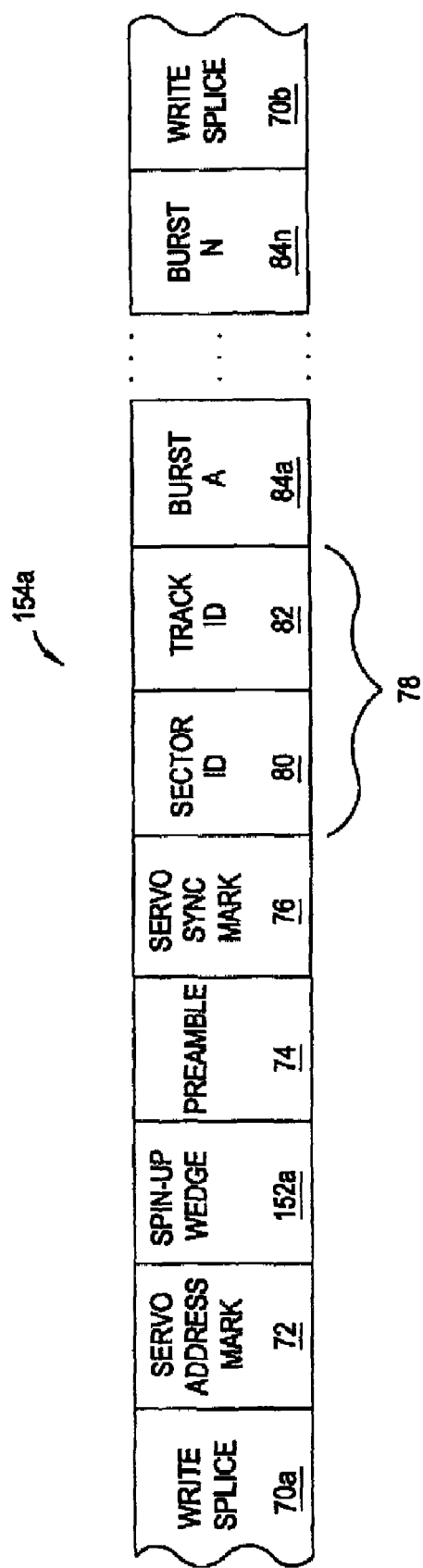
FIG. 16 is a diagram of a servo wedge that includes a spin-up wedge according to an embodiment of the invention.

FIG. 16 is a diagram of the servo wedge 154a of FIG. 15 according to an embodiment of the invention. The servo wedge 154a includes the spin-up wedge 152a and is otherwise similar to the servo wedge 22a of FIG. 6, and the other servo wedges 154 are similar to the wedge 154a. Although the spin-up wedge 152a is shown between the servo address mark (SAM) 72 and the preamble 74, the wedge 152a may occupy another position within the wedge 154a, or may be located in front of or in another location outside of the wedge 154a. Furthermore, like the servo wedge 22a, the servo wedge 154a may be encoded according to a 1/4 code, 4/12 code, or any other suitable code.

Figure 17:
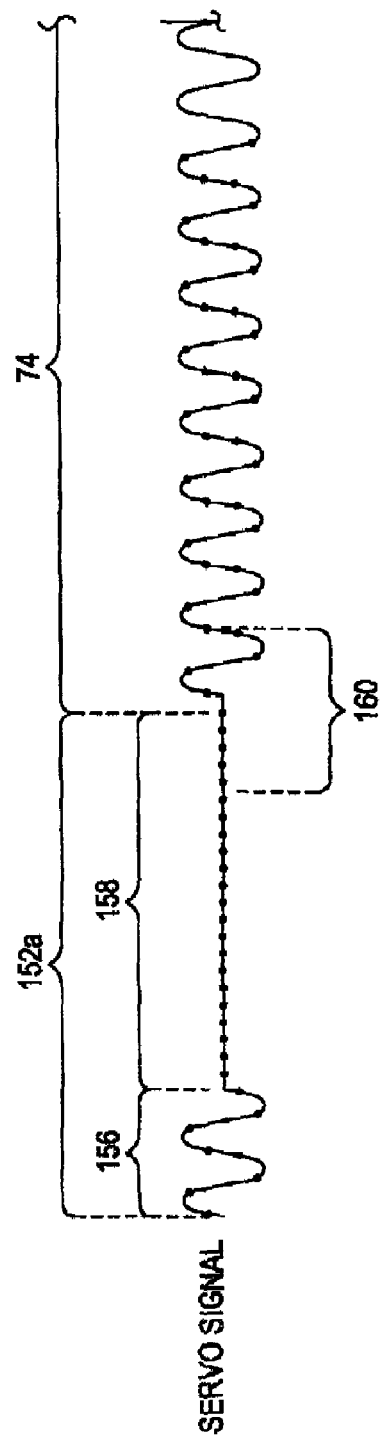
FIG. 17 is a servo signal that the read-write head generates while reading the servo wedge and preamble of FIG. 16 on disk spin up according to an embodiment of the invention.

FIG. 17 is a diagram of the servo signal when the read-write head 32 (FIG. 5) reads the spin-up wedge 152a and the preamble 74 of FIG. 16 according to an embodiment of the invention. The wedge 152a includes an introductory portion 156, which is a two-cycle sinusoid here, and a zero-frequency, i.e., DC-erase, field 158. As discussed below, the processor 40 (FIG. 5) detects the spin-up wedge 152a by detecting the DC-erase field 158 and then detecting the beginning of the preamble 74 within a qualifying window 160. Ideally, the window 160 is centered about the end of the DC-erase field 158, which is also the beginning of the preamble 74. Furthermore, the lengths of the sinusoid 156, DC-erase field 158, and qualifying window 160 may be different from the illustrated lengths of eight, twenty two, and eight samples/bits (here one sample per bit), respectively. For example, in one embodiment the processor 40 allows one to program the DC-erase field 158 to a length of twenty, twenty eight, thirty six, or forty four samples/bits and the qualifying window to a length of four or eight samples/bits.

Figure 18:
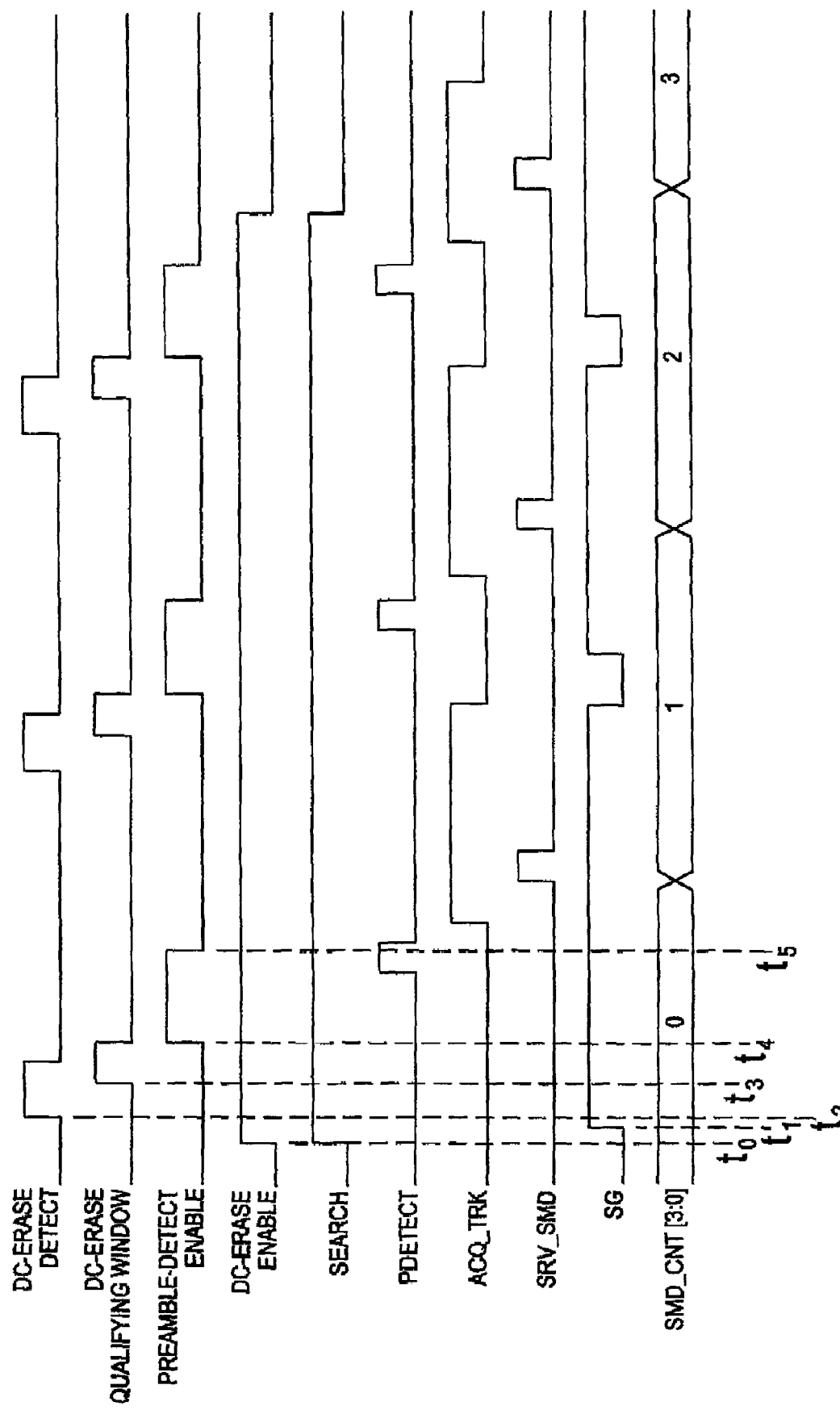
FIG. 18 is a timing diagram of signals that are relevant to the operation of the servo circuit of FIG. 5 during disk spin up according to an embodiment of the invention where the servo circuit detects a spin-up wedge.

FIG. 18 is a timing diagram of some of the signals associated with the servo circuit 30 of FIG. 5 on spin up of the disk 150 according to an embodiment of the invention where, as discussed above, the circuit 30 detects both a spin-up wedge 152 and the following preamble 74 on disk spin up. For clarity, these signals are omitted from FIG. 5. Furthermore, although active levels for all these signals are described as being logic 1, some or all of these signals may have active levels of logic 0 in other embodiments.

Still referring to FIG. 18, the disk-drive controller (FIG. 20) transitions SEARCH, SG, and DC-ERASE ENABLE to active levels to cause the processor 40 (FIG. 5) to begin searching for a servo wedge 154 on spin up of the disk 150 (FIG. 15). The active DC-ERASE ENABLE causes the processor 40 to detect the servo wedge 154 by first detecting a spin-up wedge 152 and then the following preamble 74. The processor 40 transitions DC-ERASE DETECT to an active level for as long as it detects the DC-erase field 158 (FIG. 17). The processor 40 transitions DC-ERASE QUALIFYING WINDOW to an active level for the length of the qualifying window 160 (FIG. 17). Then, the processor 40 executes the preamble-detection algorithm as discussed above in conjunction with FIGS. 4–8. If the processor 40 detects the preamble 74 within the window 160, i.e., while DC-ERASE QUALIFYING WINDOW is active, then it transitions PREAMBLE-DETECT ENABLE to an active level. In response to the active PREAMBLE-DETECT ENABLE, the processor 40 attempts to detect the preamble 74 and to recover one or more sync marks 76 (FIG. 16) in the manner discussed above in conjunction with FIGS. 4–8.

Referring to FIGS. 5 and 15–18, the operation of the servo circuit 30 is discussed for detecting a servo wedge 154 on spin up of the disk 150. This procedure is similar to the spin-up-detection procedure described above in conjunction with FIGS. 4–8 except that here, the circuit 30 detects a spin-up wedge 152 associated with the servo wedge 154 before it detects the preamble 74 of the wedge 154. Because it detects both the spin-up wedge and the preamble instead of detecting only the preamble, this spin-up detection algorithm is typically more robust than the spin-up detection algorithm described above in conjunction with FIGS. 4–8. For clarity, this procedure is discussed for detecting the spin-up wedge 152a and preamble 74 of the servo wedge 154a, the procedure being the same for the other servo wedges 154. Furthermore, in this example the DC-erase field is twenty-two samples/bits long, the qualifying window 160 is eight samples/bits long, and the servo circuit 30 takes one sample per bit of servo data.

First, the disk 150 spins up from an inactive speed, typically 0 rotations per minute (rpm), to an operating speed such as 5100 rpm. The disk 150 may be at the inactive speed during a period when the disk-drive system (FIG. 20) that incorporates the disk is powered down or is in a power-savings, i.e., sleep, mode. During or after the spin up of the disk 150, the head-position circuit (FIG. 20) moves the read-write head 32 (FIG. 5) from a parked position to a position over the disk. But the head-position circuit does not "know" the position of the head 32 until the servo circuit 30 detects the servo wedge 154a and recovers the location identifier 78 therefrom.

Next, at times $t_0$ and $t_1$, respectively, the disk-drive controller (FIG. 20) transitions SEARCH, DC-ERASE ENABLE, and SG to active levels, which cause the servo circuit 30 to "look for" and detect a servo wedge 154, here the servo wedge 154a. Specifically, the circuit 30 "looks for" and detects the DC-erase field 158 of the servo wedge 154a, and then looks for and detects the preamble 74 of the servo wedge 154a.

To detect the DC-erase field 158, the processor 40 compares the samples from the ADC 50 to a predetermined threshold. Alternately, a conventional slicer (not shown) may compare the samples to the threshold under the control of the processor 40. If a sample is above the threshold, the processor 40 determines that the sample has a non-zero, i.e., non-DC, value, and resets a DC-erase counter (not shown) and DC-ERASE DETECT. Conversely, if the sample is below the threshold, the processor 40 determines that the sample has a zero, i.e., DC, value, and increments the counter. When the counter reaches a predetermined value, for example two, the processor 40 transitions DC-ERASE DETECT to an active level at time $t_2$. The introductory sinusoid 156 insures that the processor 40 will reset the counter before the read-write head 32 begins reading the field 158, and the length of the field 158 is typically longer than the expected lengths of other strings of DC samples on the disk 150 so that the processor 40 does not mistake one of these strings for the field 158.

Once the DC-erase counter (not shown) reaches a value that indicates the beginning of the qualifying window 160, the processor 40 transitions DC-ERASE QUALIFYING WINDOW to an active level at time $t_3$ and begins searching for the preamble 74. The window 160 allows for noise or interference that may cause uncertainty in detecting the beginning of, and thus predicting the end of, the field 158.

More specifically, the processor 40 centers the window 160 about the expected end of the DC-erase field 158. Therefore, when the counter stores a nine—this is equivalent to eighteen samples because there are two samples per count cycle —the processor 40 transitions DC-ERASE QUALIFYING WINDOW at time $t_3$ to begin the window 160 four samples before the expected end of the twenty-two-sample field 158. That is, the window 160 begins after the processor 40 detects eighteen consecutive DC samples. At time $t_4$, the window 160—here eight samples/bits long—ends, and thus the processor 40 transitions DC-ERASE QUALIFYING WINDOW to an inactive level.

During the qualifying window 160 while DC-ERASE QUALIFYING WINDOW is active, the processor 40 searches for the beginning of the preamble 74 using the same preamble-detection algorithm as discussed above in conjunction with FIGS. 4–8. For example, when executing the software routine in Appendix A, the processor 40 must process three consecutive samples of the preamble 74 before it can detect the preamble. Therefore, the processor 40 can detect the preamble 74 only if at least three samples of the preamble are within the window 160. Consequently, because four preamble samples are within the window 160 in FIG. 17, the processor 40 would detect the preamble 74 within the window 160 in this example.

If the processor 40 finds the beginning of the preamble 74 within the window 160, then it transitions PREAMBLE- DETECT ENABLE to an active level at time $t_4$ to indicate detection of the DC-erase field 158, and thus detection of the spin-up wedge 152a. In response to active PREAMBLE-DETECT ENABLE, the processor 40 implements the preamble-detection and sync-mark-recovery algorithm discussed above in conjunction with FIGS. 4–8. After it has detected the preamble 74, the processor 40 transitions PREAMBLE-DETECT ENABLE to an inactive level at time $t_5$.

If the processor 40 does not detect the (i.e., after it transitions PDETECT to an active level) beginning of the preamble 74 within the window 160, then it resets the DC-erase counter (not shown) and continues searching for the DC-erase field 158 as discussed above.

Still referring to FIGS. 5 and 15–18, as discussed above, one can program the processor 40 to recover a single or multiple SSMs 76 before the disk-drive controller (FIG. 20) allows the head-position circuit (FIG. 20) to determine an initial position of the head 32 (FIG. 5). In the latter case, the processor 40 repeats the above-described algorithm for detecting the DC-erase field 158 before it detects each preamble 74 according to the algorithm discussed above in conjunction with FIGS. 4–8.

Figure 19:
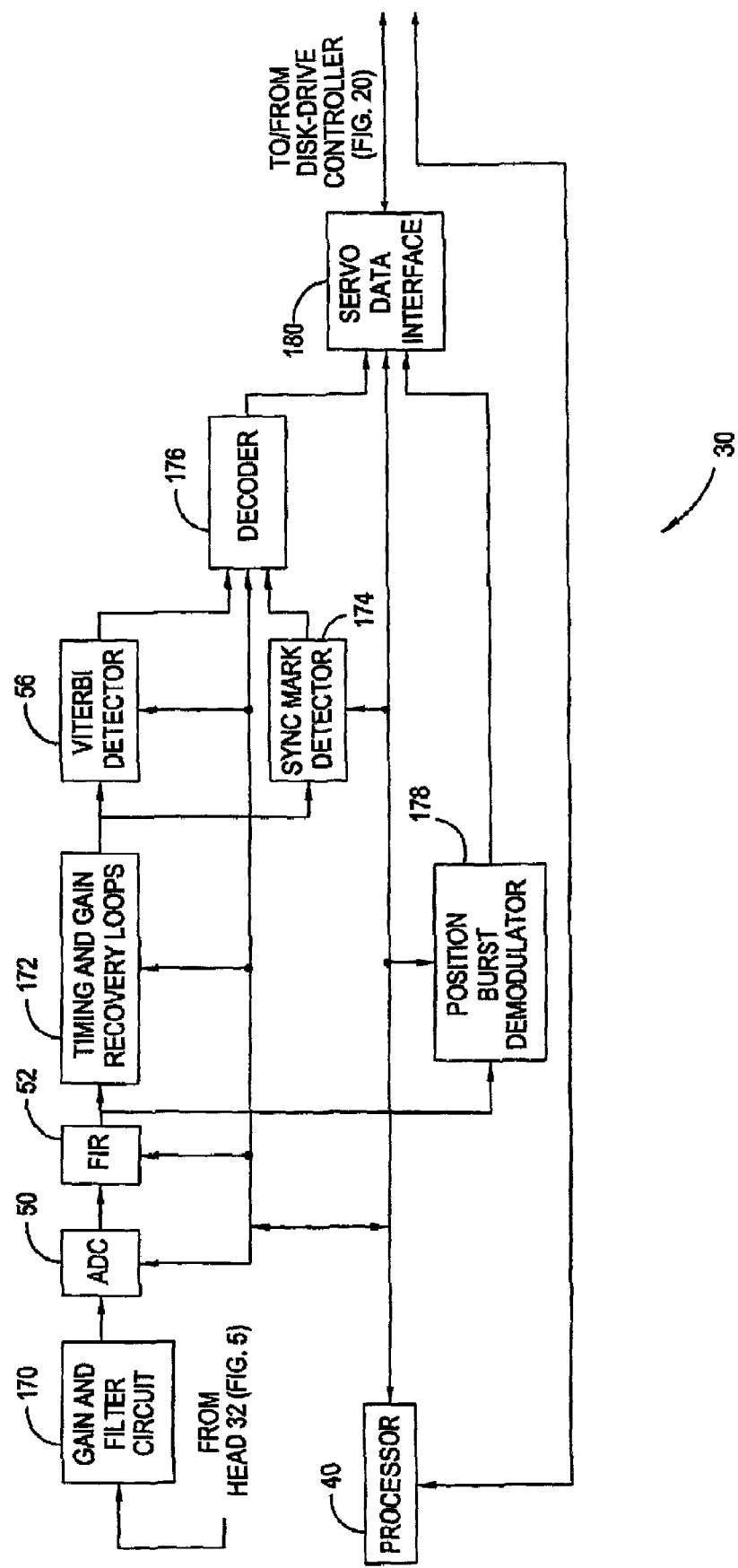
FIG. 19 is a top-level block diagram of the servo circuit of FIG. 5 according to an embodiment of the invention.

FIG. 19 is block diagram of the servo circuit 30 according to an embodiment of the invention, and includes circuitry not shown in FIG. 5. As discussed above, because the servo circuit 30 recovers servo data in a synchronous manner, it allows the density of the servo data on the disks 20 (FIG. 4) and 150 (FIG. 15) to be higher than other servo circuits, such as peak-detecting servo circuits, allow. For clarity, the preamp 42, LPF 44, gain circuit 46, and filter 48 are included in gain and filter circuit 170, and the phase and gain circuits 36 and 38 and interpolator loop 54 are included in the timing and gain recovery loops 172.

Still referring to FIG. 19, in addition to the circuit blocks of FIG. 5, the servo circuit 30 includes a sync-mark detector 174, which is separate from the Viterbi detector 56, and a decoder 176 for decoding the data recovered by the detectors 56 and 174. The circuit 30 also includes a position-burst demodulator 178, which demodulates the head-position bursts 84 (FIGS. 6 and 16), and an interface 180, which couples servo data and signals from the processor 40, decoder 176, and demodulator 178 to the disk-drive controller (FIG. 20). The sync-mark detector 174 and burst demodulator 178 are respectively discussed further in commonly owned U.S. patent application Ser. No. 09/993,779 entitled "CIRCUIT AND METHOD FOR DETECTING THE PHASE OF A SERVO SIGNAL" and Ser. No. 09/993,986 entitled "CIRCUIT AND METHOD FOR DEMODULATING A SERVO POSITION BURST", both filed the same day as the present application, which are incorporated by reference. The decoder 176 may be constructed to decode servo data that is encoded according to the 4/12 code discussed in in commonly owned U.S. Pat. No. 6,201,652 and in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL", or according to the 1/4 code discussed in Ser. No. 09/994,009, which is incorporated by reference.

In one embodiment the ADC 50, the FIR 52, and the timing and gain recovery loops 172 are shared with the circuitry (not shown) used to read and write application data to the disk 20 (FIG. 4) or disk 150 (FIG. 15). In another embodiment, the sync mark detector 174 is omitted, and the Viterbi detector 56 detects the SSM 76 (FIGS. 6 and 16).

The servo circuit 30 operates as discussed above in conjunction with FIGS. 4–9 and 15–18.

FIG. 20 is a block diagram of a disk-drive system 200 according to an embodiment of the invention. The disk-drive system 200 includes a disk drive 202, which incorporates the servo circuit 30 of FIGS. 5 and 19. The disk drive 202 includes the read-write head 32, a write channel 206 for generating and driving the head 32 with a write signal, and a write controller 208 for interfacing the write data to the write channel 206. The disk drive 202 also includes a read channel 210 for receiving servo and application-data read signals from the head 32 and for recovering data from these read signals, and includes a read controller 212 for organizing the read data. Together, the write and read controllers 208 and 212 compose a disk-drive controller 213. The read channel 210 includes the servo circuit 30, which receives the servo signal from the head 32, detects a servo wedge—or alternatively, both a spin-up wedge and a servo wedge—on disk spin up, recovers the servo data from the servo signal, and provides the recovered servo data to a head-position circuit 214. The disk drive 202 further includes a storage medium such as one or more disks 215, each of which may contain data on one or both sides and which may be magnetic, optical, or another type of storage disk. For example, the disks 215 may be similar to the disk 20 of FIG. 4 or the disk 150 of FIG. 15. The head 32 writes/reads the data stored on the disks 215, and is connected to a movable support arm 216. The head-position circuit 214 determines the position of the head 32 as discussed above and in U.S. patent application Ser. No. 09/783,801, filed Feb. 14, 2001, entitled "VITERBI DETECTOR AND METHOD FOR RECOVERING A BINARY SEQUENCE FROM A READ SIGNAL", and Ser. No. 09/993,689, filed the same day as the present application, entitled "CIRCUIT AND METHOD FOR DEMODULATING A SERVO POSITION BURST" which are incorporated by reference. The head-position circuit 214 provides a control signal to a voice-coil motor (VCM) 218, which positionally maintains/radially moves the arm 216 so as to positionally maintain/radially move the head 32 over the desired data tracks on the disks 215. A spindle motor (SPM) 220 and a SPM control circuit 222 respectively rotate the disks 215 and maintain them at the proper rotational speed.

The disk-drive system 200 also includes write and read interface adapters 224 and 226 for respectively interfacing the disk-drive controller 213 to a system bus 228, which is specific to the system used. Typical system busses include ISA, PCI, S-Bus, Nu-Bus, etc. The system 200 typically has other devices, such as a random access memory (RAM) 230 and a central processing unit (CPU) 232 coupled to the bus 228.

From the foregoing it will be appreciated that, although specific embodiments of the invention have been described herein for purposes of illustration, various modifications may be made without deviating from the spirit and scope of the invention.

APPENDIX A

```
int RunPDet (int *ADC_out)
{
    static int PD_In[2]; /*scaled FIR output*/
    if (!Ctrl.AcqTrk) {
        Zpr.PD_Fave = (int) ((abs(PD_In[0] - Zpr.PD_ykFd)+1)/2);
        Zpr.PD_Save = (int) ((abs(PD_In[1] - Zpr.PD_ykSd)+1)/2);
        Zpr.PD_AmpEst = (int) (sqrt(pow(Zpr.PD_Save,2) + pow(Zpr.PD_Fave,2)));
        Zpr.PD_ykFd = PD_In[0];
        Zpr.PD_ykSd = PD_In[1];
        PD_In[0]= (ADC_out[0];
        PD_In[1]= (ADC_out[1];
        Zpr.PD_condition[1] = Zpr.PD_condition [0];
        Zpr.PD_condition[0] = (Zpr.PD_ykFd + PD_In[0]) < Zpr.PD_Thrsh_Low;
        Zpr.PD_condition[3] = Zpr.PD _condition[2];
        Zpr.PD_condition[2] = (Zpr.PD_ykSd + PD_In[1]) < Zpr.PD_Thrsh_low;
        Zpr.PD_condition[4] = Zpr.PD_AmpEst < Zpr.PD_Thrsh_High;
        if(Zpr.PD_Counter > Zpr.PD_Qual)
            if(Zpr.PD_condition[0] && Zpr.PD_condition[1] &&
                Zpr.PD_condition[2] && Zpr.PD_condition[3] &&
                Zpr.PD_condition[4])
                {
                    Zpr.PD_Counter++;
                }
                else {
                    Zpr.PD_Counter = 0;
                }
    }
    else {
        Zpr.PD_Fave = Zpr.PD_Save = 0;
        Zpr.PD_ykFd = PD_In[0] = 0;
        Zpr.PD_ykSd = PD_In[1] = 0;
        Zpr.PD_AmpEst = 0;
        Zpr.PD_condition[1] = Zpr.PD_condition[0] = 0;
        Zpr.PD_condition[3] = Zpr.PD_condition[2] = 0;
        Zpr.PD_condition[4] = 0;
        Zpr.PD_Counter = 0;
    }
    return (Zpr.PD_Counter);
}
```

Legend of the code variables with respect to the patent application:

ADC_out [0] = current even sample Se (90c, FIG. 7) from ADC 50 (FIG. 5)
ADC_out [1] = current odd sample Oe (91c, FIG. 7) from ADC 50
PD_In[0] = first previous even sample Se - 1 (90b, FIG. 7)
PD_In[1] = first previous odd sample Oe - 1(91b, FIG. 7)
Zpr.PD_ykFd = second previous even sample Se - 2 (90a, FIG. 7)
Zpr.PD_ykSd = second previous odd sample Oe - 2 (91a, FIG. 7)
Zpr.PD_Fave = AE (equation 5)
Zpr.PD_Save = AO (equation 6)
Zpr.PD_AmpEst = Amp (equation 7)
Zpr.PD_ykFd + PD_In[0] = E1, E2 (equations 1–2)
Zpr.PD_ykSd + PD_In[1] = 01, 02 (equations 2–4)
Zpr.PD_Thrsh_Low → Threshold_Low (equations 8–11)
Zpr.PD_Thrsh_High → Threshold_High (equation 12)

What is claimed is:

1. A read channel, comprising:

a synchronous partial-response-maximum-likelihood servo channel operable to recover servo data from servo wedges that identify respective data sectors on a data-storage disk, the servo channel at all times being inoperable to recover data from the data sectors a synchronous partial-response-maximum-likelihood data channel operable to recover data from the data sectors on the storage disk; and a processor coupled to and operable to control the servo channels.

2. The servo circuit of claim 1 wherein:

the servo channel is operable to receive a servo-data sample clock; and the servo channel comprises a digital timing-recovery loop operable to synchronize the sample clock to the servo data.

3. The servo circuit of claim 1 wherein:

the servo channel is operable to receive a servo signal that represents the servo data, the servo signal having an amplitude; and the servo channel comprises a digital gain-recovery loop operable to adjust the gain of the servo signal to a target.

4. The servo circuit of claim 1 wherein:

the servo channel is operable to receive a servo-data sample clock; and the servo channel comprises a circuit operable to calculate an initial phase difference between the sample clock and the servo data.

5. The servo circuit of claim 1 wherein:

the servo channel is operable to receive a servo signal that represents the servo data, the servo signal having an amplitude; and the servo channel comprises a circuit operable to digitally calculate an initial gain of the servo signal.

6. The servo circuit of claim 1 wherein the servo channel includes a Viterbi detector operable to recover the servo data from the servo wedges.

7. The servo circuit of claim 1 wherein the servo channel includes a decoder operable to decode the recovered servo data.

8. The servo circuit of claim 1, further comprising a demodulator for asynchronously recovering a characteristic of a position burst from the servo data.

9. The servo circuit of claim 1, further comprising an interface circuit operable to couple the recovered servo data to and receive data from a circuit external to the servo circuit.

10. The servo circuit of claim 1 wherein the synchronous servo channel is operable to detect spin-up wedges on the data-storage disk during a spin-up search operation.

11. The servo circuit of claim 1 wherein the servo channel includes an analog-to-digital converter operable to convert an analog PR4-equalized servo signal into the digital domain.

12. A servo circuit, comprising:
a synchronous partial response maximum likelihood servo channel operable to recover servo data from servo wedges that identify respective data sectors on a data-storage disk; and
a processor coupled to and operable to control the servo channel, the processor also operable to detect one of the servo wedges during or after a disk spin-up search operation without detecting a spin-up wedge, the detected servo wedge being the first servo wedge that the processor detects after the disk spin-up search operation begins.

13. A disk-drive system, comprising:
a data-storage disk having a surface, data sectors at respective locations of the surface and operable to store application data, and servo wedges that each include respective servo data that identifies the location of a respective data sector;
a motor coupled to and operable to rotate the disk;
a read head operable to generate a first read signal that represents the application data and a second read signal that represents the servo data, the read head having a position with respect to the surface of the data-storage disk;
a read-head positioning circuit operable to move the read head over the surface of the disk; and
a read channel coupled to the read head and including a first Viterbi detector operable to recover the application data from the data sectors, the read channel further including a servo circuit coupled to the read-head positioning system, the servo circuit including,
a synchronous servo channel having a second Viterbi detector operable to recover the servo data from the servo wedges, the second Viterbi detector different than the first Viterbi detector; and
a processor coupled to and operable to control the servo channel.

14. A method, comprising:
reading a data-storage disk having a surface and having servo sectors and data sectors disposed on the surface, the servo sectors including servo data and the data sectors including application data;
synchronously recovering the servo data from the servo sectors with a first partial-response-maximum-likelihood-detection algorithm; and
synchronously recovering the application data from the data sectors with a second partial-response-maximum-likelihood-detection algorithm that is different than the first algorithm.

15. The method of claim 14, further comprising:
generating a servo signal that represents the servo data;
sampling the servo signal; and
synchronizing a sample clock to the servo data by interpolating the values of the samples.

16. The method of claim 14, further comprising:
generating a servo signal that represents the servo data;
sampling the servo signal; and
digitally adjusting the amplitude of the servo signal to a target level.

17. The method of claim 14, further comprising:
sampling the servo data with a sample clock;
calculating an initial phase difference between the sample clock and the servo data; and
using the initial phase difference to facilitate synchronizing the sample clock to the servo data.

18. The method of claim 14, further comprising:
generating a servo signal that represents the servo data;
calculating an initial difference between the amplitude of the servo signal and a predetermined amplitude; and
using the initial difference to facilitate adjusting the amplitude of the servo signal toward the predetermined amplitude.

19. The method of claim 14, further comprising decoding the recovered servo data.

20. The method of claim 14, further comprising asynchronously demodulating a servo-position burst from the servo data.

21. The method of claim 14, further comprising:
asynchronously detecting a servo sector while or after the disk rotates from a first to a steady-state speed; and
reading the servo data from the detected servo sector to determine an initial position of a read head with respect to the surface of the disk.

22. The method of claim 14, further comprising asynchronously recovering spin-up data from a spin-up wedge that is disposed on the surface of the data-storage disk.

23. A method, comprising:
asynchronously detecting a servo sector disposed on a surface of a data-storage disk while or after the disk rotates from a starting speed to a steady-state speed without detecting a spin-up wedge, the detected servo sector being the first servo sector detected after the disk begins to rotate from the starting speed to the steady-state speed; and
synchronously recovering servo data from the detected servo sector with a partial-response-maximum-likelihood-detection algorithm to determine an initial position of a read head with respect to the surface of the disk.

* * * * *